(12) United States Patent
Tarleton et al.

(10) Patent No.: US 8,543,146 B2
(45) Date of Patent: Sep. 24, 2013

(54) METHOD AND SYSTEM FOR EFFICIENTLY ROUTING MESSAGES

(75) Inventors: Bryan Keith Tarleton, Buford, GA (US); Michael J. Criscolo, Alpharetta, GA (US); Edward I. Comer, Brevard, NC (US); William George Simitses, Atlanta, GA (US)

(73) Assignee: Cellemetry, LLC, Atlanta, GA (US)

( * ) Notice: Subject to any disclaimer, the term of this patent is extended or adjusted under 35 U.S.C. 154(b) by 17 days.

(21) Appl. No.: 13/247,316

(22) Filed: Sep. 28, 2011

(65) Prior Publication Data

US 2012/0015677 A1  Jan. 19, 2012

Related U.S. Application Data

(63) Continuation of application No. 12/704,290, filed on Feb. 11, 2010, now Pat. No. 8,060,067, which is a continuation of application No. 11/811,855, filed on Jun. 12, 2007, now Pat. No. 7,680,505, which is a continuation of application No. 10/885,445, filed on Jul. 6, 2004, now Pat. No. 7,245,928, which is a continuation-in-part of application No. 09/699,312, filed on Oct. 27, 2000, now Pat. No. 6,856,808.

(51) Int. Cl.
*H04W 4/14* (2009.01)

(52) U.S. Cl.
USPC ............... 455/466; 455/414.4; 455/432.2

(58) Field of Classification Search
USPC ............. 455/412.1–412.2, 413, 414.4, 432.2, 455/466, 432.1; 370/465, 466–467
See application file for complete search history.

(56) References Cited

U.S. PATENT DOCUMENTS

| | | |
|---|---|---|
| 3,581,019 A | 5/1971 | Ryan |
| 3,886,515 A | 5/1975 | Cottin et al. |
| 3,973,200 A | 8/1976 | Akerberg |
| 4,172,969 A | 10/1979 | Levine et al. |
| 4,219,698 A | 8/1980 | Birilli et al. |
| 4,263,480 A | 4/1981 | Levine |
| 4,284,849 A | 8/1981 | Anderson et al. |

(Continued)

FOREIGN PATENT DOCUMENTS

| | | |
|---|---|---|
| EP | 0 123 456 A2 | 10/1984 |
| EP | 0 123 562 B1 | 7/1990 |

(Continued)

OTHER PUBLICATIONS

EIA/TIA IS-54-B Standard; p. 115 and pp. 215-222.

(Continued)

*Primary Examiner* — Cong Tran
(74) *Attorney, Agent, or Firm* — King & Spalding

(57) ABSTRACT

Efficient routing of a message over a data network. A first communication device sends a message to a telemetry gateway or short message arbitrator. The telemetry gateway or short message arbitrator determines the communication protocol of the first communication device and the communication protocol of a second communication device. The telemetry gateway or short message arbitrator converts the message to a data format compatible with the second communication device, wherein the message is converted to one of at least three different communication protocols. The telemetry gateway or short message arbitrator then forwards the message for receipt by the second communication device. The telemetry gateway or short message arbitrator can convert and forward the message without completing a store and forward process.

30 Claims, 13 Drawing Sheets

(56) References Cited

U.S. PATENT DOCUMENTS

| | | |
|---|---|---|
| 4,342,986 A | 8/1982 | Buskirk et al. |
| 4,361,730 A | 11/1982 | Barber et al. |
| 4,371,751 A | 2/1983 | Hilligoss, Jr. et al. |
| 4,412,292 A | 10/1983 | Sedam et al. |
| 4,454,027 A | 6/1984 | Fenton |
| 4,486,624 A | 12/1984 | Puhl et al. |
| 4,492,820 A | 1/1985 | Kennard et al. |
| 4,644,347 A | 2/1987 | Lucas et al. |
| 4,644,351 A | 2/1987 | Zabarsky et al. |
| 4,646,082 A | 2/1987 | Engel et al. |
| 4,677,653 A | 6/1987 | Weiner et al. |
| 4,724,425 A | 2/1988 | Gerhart et al. |
| 4,734,928 A | 3/1988 | Weiner et al. |
| 4,750,197 A | 6/1988 | Denekamp et al. |
| 4,766,548 A | 8/1988 | Cedrone et al. |
| 4,783,747 A | 11/1988 | Komori et al. |
| 4,791,658 A | 12/1988 | Simon et al. |
| 4,807,225 A | 2/1989 | Fitch |
| 4,814,763 A | 3/1989 | Nelson et al. |
| 4,823,123 A | 4/1989 | Siwiak |
| 4,825,193 A | 4/1989 | Siwiak et al. |
| 4,825,457 A | 4/1989 | Lebowitz |
| 4,833,701 A | 5/1989 | Comroe et al. |
| 4,837,800 A | 6/1989 | Freeburg et al. |
| 4,839,917 A | 6/1989 | Oliver |
| 4,866,445 A | 9/1989 | Valero et al. |
| 4,868,560 A | 9/1989 | Oliwa et al. |
| 4,868,859 A | 9/1989 | Sheffer |
| 4,875,038 A | 10/1989 | Siwiak et al. |
| 4,875,230 A | 10/1989 | Blair |
| 4,882,579 A | 11/1989 | Siwiak |
| 4,887,290 A | 12/1989 | Dop et al. |
| 4,887,291 A | 12/1989 | Stillwell |
| 4,890,315 A | 12/1989 | Bendixen et al. |
| 4,891,637 A | 1/1990 | Siwiak et al. |
| 4,891,638 A | 1/1990 | Davis |
| 4,901,340 A | 2/1990 | Parker et al. |
| 4,905,234 A | 2/1990 | Childress et al. |
| 4,914,651 A | 4/1990 | Lusignan |
| 4,928,096 A | 5/1990 | Leonardo et al. |
| 4,940,963 A | 7/1990 | Gutman et al. |
| 4,972,460 A | 11/1990 | Sasuta |
| 4,979,169 A | 12/1990 | Almond et al. |
| 4,993,059 A | 2/1991 | Smith et al. |
| 5,005,014 A | 4/1991 | Jasinski |
| 5,010,584 A | 4/1991 | Seki |
| 5,020,091 A | 5/1991 | Krolopp et al. |
| 5,020,093 A | 5/1991 | Pireh |
| 5,027,383 A | 6/1991 | Sheffer |
| 5,029,098 A | 7/1991 | Levasseaur |
| 5,031,204 A | 7/1991 | McKernan |
| 5,047,763 A | 9/1991 | Kuznicki et al. |
| 5,073,919 A | 12/1991 | Hagensick |
| 5,081,667 A | 1/1992 | Drori et al. |
| 5,087,919 A | 2/1992 | Odagawa et al. |
| 5,090,051 A | 2/1992 | Muppidi et al. |
| 5,117,449 A | 5/1992 | Metroka et al. |
| 5,121,503 A | 6/1992 | Davis |
| 5,124,697 A | 6/1992 | Moore |
| 5,131,019 A | 7/1992 | Sheffer et al. |
| 5,134,644 A | 7/1992 | Garton et al. |
| 5,142,279 A | 8/1992 | Jasinski et al. |
| 5,148,473 A | 9/1992 | Freeland et al. |
| 5,153,582 A | 10/1992 | Davis |
| 5,153,902 A | 10/1992 | Buhl et al. |
| 5,153,903 A | 10/1992 | Eastmond et al. |
| 5,159,625 A | 10/1992 | Zicker |
| 5,162,790 A | 11/1992 | Jasinski |
| 5,173,933 A | 12/1992 | Jabs et al. |
| 5,175,758 A | 12/1992 | Levanto et al. |
| 5,185,779 A | 2/1993 | Dop et al. |
| 5,196,842 A | 3/1993 | Gomez et al. |
| 5,206,855 A | 4/1993 | Schwendeman et al. |
| 5,207,784 A | 5/1993 | Schwartzendruber |
| 5,208,756 A | 5/1993 | Song |
| 5,210,787 A | 5/1993 | Hayes et al. |
| 5,218,367 A | 6/1993 | Sheffer et al. |
| 5,220,599 A | 6/1993 | Sasano et al. |
| 5,222,123 A | 6/1993 | Brown et al. |
| 5,230,081 A | 7/1993 | Yamada et al. |
| 5,239,294 A | 8/1993 | Flanders et al. |
| 5,239,678 A | 8/1993 | Grube et al. |
| 5,247,567 A | 9/1993 | Hirano |
| 5,254,986 A | 10/1993 | DeLuca |
| 5,255,307 A | 10/1993 | Mizikovsky |
| 5,265,150 A | 11/1993 | Helmkamp et al. |
| 5,278,539 A | 1/1994 | Lauterbach et al. |
| 5,278,890 A | 1/1994 | Beeson, Jr. et al. |
| 5,305,217 A | 4/1994 | Nakamura et al. |
| 5,307,399 A | 4/1994 | Dai et al. |
| 5,307,509 A | 4/1994 | Michalon et al. |
| 5,335,278 A | 8/1994 | Matchett et al. |
| 5,341,410 A | 8/1994 | Aron et al. |
| 5,363,427 A | 11/1994 | Ekstrom et al. |
| 5,365,573 A | 11/1994 | Sakamoto et al. |
| 5,369,681 A | 11/1994 | Boudreau et al. |
| 5,371,781 A | 12/1994 | Ardon |
| 5,371,898 A | 12/1994 | Grube et al. |
| 5,382,970 A | 1/1995 | Kiefl |
| 5,386,209 A | 1/1995 | Thomas |
| 5,396,537 A | 3/1995 | Schwendeman |
| 5,396,539 A | 3/1995 | Slekys et al. |
| 5,398,277 A | 3/1995 | Martin, Jr. et al. |
| 5,404,392 A | 4/1995 | Miller et al. |
| 5,432,841 A | 7/1995 | Rimer |
| 5,450,329 A | 9/1995 | Tanner |
| 5,453,730 A | 9/1995 | De-Grinis et al. |
| 5,454,027 A | 9/1995 | Kennedy et al. |
| 5,493,722 A | 2/1996 | Gunn et al. |
| 5,502,761 A | 3/1996 | Duncan et al. |
| 5,511,072 A | 4/1996 | Delprat |
| 5,511,110 A | 4/1996 | Drucker |
| 5,517,547 A | 5/1996 | Ladha et al. |
| 5,519,756 A | 5/1996 | Clift |
| 5,526,401 A | 6/1996 | Roach, Jr. et al. |
| 5,528,664 A | 6/1996 | Slekys et al. |
| 5,530,736 A | 6/1996 | Comer et al. |
| 5,533,094 A | 7/1996 | Sanmugam |
| 5,539,810 A | 7/1996 | Kennedy, III et al. |
| 5,544,223 A | 8/1996 | Robbins et al. |
| 5,544,225 A | 8/1996 | Kennedy, III et al. |
| 5,546,444 A | 8/1996 | Roach, Jr. et al. |
| 5,574,975 A | 11/1996 | Hill |
| 5,579,372 A | 11/1996 | Åström |
| 5,586,177 A | 12/1996 | Farris et al. |
| 5,594,740 A | 1/1997 | LaDue |
| 5,594,945 A | 1/1997 | Lewis et al. |
| 5,596,573 A | 1/1997 | Bertland |
| 5,603,091 A | 2/1997 | Linquist et al. |
| 5,610,973 A | 3/1997 | Comer |
| 5,619,209 A | 4/1997 | Horstein et al. |
| 5,625,889 A | 4/1997 | Chikkaswamy et al. |
| 5,629,975 A | 5/1997 | Tiedemann, Jr. et al. |
| 5,640,139 A | 6/1997 | Egeberg |
| 5,648,966 A | 7/1997 | Kondo et al. |
| 5,652,564 A | 7/1997 | Winbush |
| 5,652,570 A | 7/1997 | Lepkofker |
| 5,675,371 A | 10/1997 | Barringer |
| 5,678,179 A | 10/1997 | Turcotte et al. |
| 5,680,551 A | 10/1997 | Martino, II |
| 5,684,858 A | 11/1997 | Hartmann et al. |
| 5,686,888 A | 11/1997 | Welles, II et al. |
| 5,701,302 A | 12/1997 | Geiger |
| 5,722,067 A | 2/1998 | Fougnies et al. |
| 5,742,668 A | 4/1998 | Pepe et al. |
| 5,742,905 A | 4/1998 | Pepe et al. |
| 5,745,867 A | 4/1998 | Mills |
| 5,748,104 A | 5/1998 | Argyroudis et al. |
| 5,751,789 A | 5/1998 | Farris et al. |
| 5,754,954 A | 5/1998 | Cannon et al. |
| 5,758,313 A | 5/1998 | Shah et al. |
| 5,761,621 A | 6/1998 | Sainton |
| 5,767,788 A | 6/1998 | Ness |
| 5,768,343 A | 6/1998 | Dame et al. |

| Patent | Type | Date | Inventor |
|---|---|---|---|
| 5,777,605 | A | 7/1998 | Yoshinobu et al. |
| 5,781,612 | A | 7/1998 | Choi et al. |
| 5,787,149 | A | 7/1998 | Yousefi et al. |
| 5,787,357 | A | 7/1998 | Salin |
| 5,790,631 | A | 8/1998 | Minarczik et al. |
| 5,793,306 | A | 8/1998 | Vershinin et al. |
| 5,794,144 | A | 8/1998 | Comer et al. |
| 5,797,097 | A | 8/1998 | Roach, Jr. et al. |
| 5,805,997 | A | 9/1998 | Farris |
| 5,819,184 | A | 10/1998 | Cashman |
| 5,822,221 | A | 10/1998 | Groenteman |
| 5,822,423 | A | 10/1998 | Jehnert et al. |
| 5,826,195 | A | 10/1998 | Westerlage et al. |
| 5,835,868 | A | 11/1998 | McElroy et al. |
| 5,844,808 | A | 12/1998 | Konsmo et al. |
| 5,845,203 | A | 12/1998 | LaDue |
| 5,845,211 | A | 12/1998 | Roach, Jr. |
| 5,862,201 | A | 1/1999 | Sands |
| 5,862,480 | A | 1/1999 | Wild et al. |
| 5,862,481 | A | 1/1999 | Kulkarni et al. |
| 5,873,043 | A | 2/1999 | Comer |
| 5,875,863 | A | 3/1999 | Jarvis et al. |
| 5,878,351 | A | 3/1999 | Alanara et al. |
| 5,884,216 | A | 3/1999 | Shah et al. |
| 5,889,474 | A | 3/1999 | LaDue |
| 5,898,917 | A | 4/1999 | Batni et al. |
| 5,901,142 | A | 5/1999 | Averbuch et al. |
| 5,909,651 | A | 6/1999 | Chander et al. |
| 5,913,166 | A | 6/1999 | Buttitta et al. |
| 5,917,449 | A | 6/1999 | Sanderford et al. |
| 5,917,886 | A | 6/1999 | Halkio |
| 5,918,172 | A | 6/1999 | Saunders et al. |
| 5,920,822 | A | 7/1999 | Houde et al. |
| 5,923,731 | A | 7/1999 | McClure |
| 5,924,026 | A | 7/1999 | Krishnan |
| 5,933,784 | A | 8/1999 | Gallagher et al. |
| 5,937,161 | A | 8/1999 | Mulligan et al. |
| 5,946,629 | A * | 8/1999 | Sawyer et al. ............... 455/466 |
| 5,946,630 | A | 8/1999 | Willars et al. |
| 5,983,197 | A | 11/1999 | Enta |
| 5,999,808 | A | 12/1999 | LaDue |
| 6,011,321 | A | 1/2000 | Stancu et al. |
| 6,012,013 | A | 1/2000 | McBurney |
| 6,012,014 | A | 1/2000 | Koyanagi et al. |
| 6,014,089 | A | 1/2000 | Tracy et al. |
| 6,018,657 | A | 1/2000 | Kennedy, III et al. |
| 6,021,394 | A | 2/2000 | Takahashi |
| 6,025,774 | A | 2/2000 | Forbes |
| 6,026,345 | A | 2/2000 | Shah et al. |
| 6,049,273 | A | 4/2000 | Hess |
| 6,067,454 | A | 5/2000 | Foti |
| 6,070,070 | A | 5/2000 | Ladue |
| 6,072,862 | A | 6/2000 | Srinivasan |
| 6,078,811 | A | 6/2000 | Lin et al. |
| 6,078,820 | A | 6/2000 | Wells et al. |
| 6,081,514 | A | 6/2000 | Raith |
| 6,081,546 | A | 6/2000 | Williamson et al. |
| 6,088,431 | A | 7/2000 | LaDue |
| 6,091,961 | A * | 7/2000 | Khalil ............... 455/466 |
| 6,094,578 | A | 7/2000 | Purcell et al. |
| 6,097,951 | A | 8/2000 | Ernam et al. |
| 6,108,537 | A | 8/2000 | Comer et al. |
| 6,108,540 | A | 8/2000 | Sonti et al. |
| 6,111,539 | A | 8/2000 | Mannings et al. |
| 6,122,514 | A | 9/2000 | Spaur et al. |
| 6,125,275 | A | 9/2000 | Comer et al. |
| 6,138,034 | A | 10/2000 | Willey |
| 6,144,722 | A | 11/2000 | Anderson et al. |
| 6,144,859 | A | 11/2000 | LaDue |
| 6,148,202 | A | 11/2000 | Wortham |
| 6,150,955 | A | 11/2000 | Tracy et al. |
| 6,151,507 | A | 11/2000 | Laiho et al. |
| 6,154,648 | A | 11/2000 | Comer |
| 6,154,658 | A | 11/2000 | Caci |
| 6,161,020 | A | 12/2000 | Kim |
| 6,163,701 | A | 12/2000 | Saleh et al. |
| 6,169,895 | B1 | 1/2001 | Buhrmann et al. |
| 6,172,974 | B1 | 1/2001 | Tseng et al. |
| 6,175,732 | B1 | 1/2001 | McDaniel et al. |
| 6,181,981 | B1 | 1/2001 | Varga et al. |
| 6,185,198 | B1 | 2/2001 | LaDue |
| 6,195,546 | B1 | 2/2001 | Leung et al. |
| 6,215,404 | B1 | 4/2001 | Morales |
| 6,233,450 | B1 | 5/2001 | Seppanen |
| 6,236,357 | B1 | 5/2001 | Corwith |
| 6,249,217 | B1 | 6/2001 | Forbes |
| 6,259,405 | B1 | 7/2001 | Stewart et al. |
| 6,259,781 | B1 | 7/2001 | Crouch et al. |
| 6,263,212 | B1 | 7/2001 | Ross et al. |
| 6,278,697 | B1 | 8/2001 | Brody et al. |
| 6,282,496 | B1 | 8/2001 | Chowdhary |
| 6,285,868 | B1 | 9/2001 | LaDue |
| 6,285,953 | B1 | 9/2001 | Harrison et al. |
| 6,292,669 | B1 | 9/2001 | Meuronen et al. |
| 6,297,768 | B1 | 10/2001 | Allen, Jr. |
| 6,298,232 | B1 | 10/2001 | Marin et al. |
| 6,311,056 | B1 | 10/2001 | Sandidge |
| 6,311,060 | B1 | 10/2001 | Evans et al. |
| 6,330,452 | B1 | 12/2001 | Fattouche et al. |
| 6,339,731 | B1 | 1/2002 | Morris et al. |
| 6,353,743 | B1 | 3/2002 | Karmel |
| 6,353,745 | B1 | 3/2002 | Wehrend et al. |
| 6,363,249 | B1 | 3/2002 | Nordeman et al. |
| 6,363,254 | B1 | 3/2002 | Jones et al. |
| 6,363,324 | B1 | 3/2002 | Hildebrant |
| 6,366,791 | B1 | 4/2002 | Lin et al. |
| 6,369,719 | B1 | 4/2002 | Tracy et al. |
| 6,370,135 | B1 | 4/2002 | Gardner |
| 6,377,210 | B1 | 4/2002 | Moore |
| 6,389,289 | B1 | 5/2002 | Voce et al. |
| 6,393,295 | B1 | 5/2002 | Butler et al. |
| 6,393,296 | B1 * | 5/2002 | Sabnani et al. ............... 455/466 |
| 6,397,056 | B1 | 5/2002 | Bugnon et al. |
| 6,405,033 | B1 | 6/2002 | Kennedy, III et al. |
| 6,415,156 | B1 | 7/2002 | Stadelmann |
| 6,424,828 | B1 | 7/2002 | Collins et al. |
| 6,424,841 | B1 | 7/2002 | Gustafsson |
| 6,457,038 | B1 | 9/2002 | Defosse |
| 6,463,445 | B1 * | 10/2002 | Suzuki et al. ............... 1/1 |
| 6,476,763 | B2 | 11/2002 | Allen, Jr. |
| 6,484,035 | B2 | 11/2002 | Allen, Jr. |
| 6,487,602 | B1 | 11/2002 | Thakker |
| 6,493,556 | B1 | 12/2002 | Stinson |
| 6,493,558 | B1 | 12/2002 | Bernhart et al. |
| 6,505,050 | B1 | 1/2003 | Brudos et al. |
| 6,515,997 | B1 | 2/2003 | Feltner et al. |
| 6,516,197 | B2 | 2/2003 | Havinis et al. |
| 6,553,336 | B1 | 4/2003 | Johnson et al. |
| 6,560,456 | B1 | 5/2003 | Lohtia et al. |
| 6,567,501 | B1 | 5/2003 | Pernu et al. |
| 6,570,532 | B2 | 5/2003 | Mise et al. |
| 6,603,755 | B1 | 8/2003 | Parker |
| 6,608,553 | B2 | 8/2003 | Isobe |
| 6,611,689 | B1 | 8/2003 | Cartigny et al. |
| 6,618,671 | B2 | 9/2003 | Dooley et al. |
| 6,622,016 | B1 | 9/2003 | Sladek et al. |
| 6,625,142 | B1 * | 9/2003 | Joffe et al. ............... 370/356 |
| 6,625,461 | B1 | 9/2003 | Bertacchi |
| 6,643,511 | B1 | 11/2003 | Rune et al. |
| 6,665,532 | B1 | 12/2003 | Boland et al. |
| 6,683,881 | B1 | 1/2004 | Mijares et al. |
| 6,710,738 | B2 | 3/2004 | Allen, Jr. |
| 6,714,793 | B1 | 3/2004 | Carey et al. |
| 6,718,177 | B1 | 4/2004 | Comer et al. |
| 6,718,237 | B1 | 4/2004 | Murray et al. |
| 6,738,647 | B1 | 5/2004 | Link, II |
| 6,741,853 | B1 | 5/2004 | Jiang et al. |
| 6,741,863 | B1 | 5/2004 | Chiang et al. |
| 6,745,041 | B2 | 6/2004 | Allison et al. |
| 6,760,580 | B2 | 7/2004 | Robinson et al. |
| 6,771,949 | B1 | 8/2004 | Corliss |
| 6,782,276 | B1 | 8/2004 | Lam et al. |
| 6,826,397 | B1 | 11/2004 | Vasa |
| 6,856,808 | B1 | 2/2005 | Comer et al. |
| 6,861,947 | B2 | 3/2005 | Albert |
| 6,865,191 | B1 | 3/2005 | Bengtsson et al. |
| 6,882,843 | B1 | 4/2005 | Comer |
| 6,912,230 | B1 | 6/2005 | Salkini et al. |

| | | | |
|---|---|---|---|
| 6,938,087 B1 * | 8/2005 | Abu-Samaha | 709/227 |
| 6,959,192 B1 | 10/2005 | Cannon et al. | |
| 6,961,330 B1 * | 11/2005 | Cattan et al. | 370/352 |
| 6,980,887 B2 | 12/2005 | Varga et al. | |
| 6,982,656 B1 | 1/2006 | Coppinger et al. | |
| 7,005,997 B1 | 2/2006 | Wiewiura | |
| 7,010,306 B1 | 3/2006 | Tanibayashi et al. | |
| 7,058,076 B1 | 6/2006 | Jiang | |
| 7,164,936 B2 * | 1/2007 | Heatley | 455/566 |
| 7,257,122 B1 * | 8/2007 | Keturi | 370/401 |
| 7,493,381 B2 * | 2/2009 | Garg | 709/223 |
| 2001/0003093 A1 | 6/2001 | Lundin | |
| 2001/0016495 A1 * | 8/2001 | Chandnani et al. | 455/445 |
| 2001/0042121 A1 | 11/2001 | Defosse et al. | |
| 2001/0047244 A1 | 11/2001 | Harrison et al. | |
| 2001/0047410 A1 | 11/2001 | Defosse | |
| 2001/0054083 A1 | 12/2001 | Defosse | |
| 2002/0016829 A1 | 2/2002 | Defosse | |
| 2002/0086636 A1 | 7/2002 | Tracy et al. | |
| 2002/0110230 A1 | 8/2002 | Leuca et al. | |
| 2002/0120728 A1 | 8/2002 | Braatz et al. | |
| 2002/0142759 A1 | 10/2002 | Newell et al. | |
| 2002/0155844 A1 | 10/2002 | Rankin et al. | |
| 2002/0160771 A1 | 10/2002 | Massie et al. | |
| 2002/0164988 A1 | 11/2002 | Vishwanathan et al. | |
| 2002/0193127 A1 * | 12/2002 | Martschitsch | 455/466 |
| 2002/0194387 A1 | 12/2002 | Defosse | |
| 2002/0196924 A1 | 12/2002 | Dahari | |
| 2003/0003930 A1 | 1/2003 | Allison et al. | |
| 2003/0009313 A1 | 1/2003 | May et al. | |
| 2003/0021273 A1 | 1/2003 | Fouquet et al. | |
| 2003/0022656 A1 | 1/2003 | Hinnant, Jr. et al. | |
| 2003/0054830 A1 | 3/2003 | Williams et al. | |
| 2003/0097474 A1 | 5/2003 | Defosse et al. | |
| 2003/0101257 A1 | 5/2003 | Godwin | |
| 2003/0101262 A1 | 5/2003 | Godwin | |
| 2003/0119489 A1 | 6/2003 | Mohammed | |
| 2003/0119498 A1 | 6/2003 | Haas et al. | |
| 2003/0129969 A1 | 7/2003 | Rucinski | |
| 2003/0141990 A1 | 7/2003 | Coon | |
| 2003/0158650 A1 | 8/2003 | Abe et al. | |
| 2003/0182053 A1 | 9/2003 | Swope et al. | |
| 2003/0204391 A1 | 10/2003 | May et al. | |
| 2004/0029598 A1 | 2/2004 | Guggisberg | |
| 2004/0110493 A1 | 6/2004 | Alvarez et al. | |
| 2004/0142707 A1 | 7/2004 | Midkiff et al. | |
| 2004/0180678 A1 | 9/2004 | Smith et al. | |
| 2004/0199649 A1 * | 10/2004 | Tarnanen et al. | 709/230 |
| 2004/0203640 A1 | 10/2004 | Molander et al. | |
| 2005/0037784 A1 | 2/2005 | Cleary | |
| 2005/0102074 A1 | 5/2005 | Kolls | |
| 2005/0197106 A1 | 9/2005 | Bristow et al. | |

FOREIGN PATENT DOCUMENTS

| | | |
|---|---|---|
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |
| WO | WO 94/05095 A1 | 3/1994 |
| WO | WO 95/24791 A1 | 9/1995 |
| WO | WO 95/25407 A1 | 9/1995 |
| WO | WO 95/26088 A1 | 9/1995 |
| WO | WO 96/03007 A1 | 2/1996 |
| WO | WO 96/10895 A1 | 4/1996 |
| WO | WO 96/37079 A1 | 11/1996 |
| WO | WO 96/38989 A1 | 12/1996 |
| WO | WO 97/36435 A1 | 10/1997 |
| WO | WO 97/38540 A1 | 10/1997 |
| WO | WO 97/45991 A2 | 12/1997 |
| WO | WO 98/06227 A2 | 2/1998 |
| WO | WO 98/19438 A1 | 5/1998 |
| WO | WO 98/19447 A1 | 5/1998 |
| WO | WO 98/27780 A2 | 6/1998 |
| WO | WO 99/26428 A1 | 5/1999 |
| WO | WO 99/60769 A1 | 11/1999 |
| WO | WO 00/03532 A2 | 1/2000 |
| WO | WO 00/17021 A1 | 3/2000 |
| WO | WO 00/28347 A1 | 5/2000 |
| WO | WO 00/36812 A1 | 6/2000 |
| WO | WO 01/63825 A2 | 8/2001 |
| WO | WO 01/63960 A1 | 8/2001 |
| WO | WO 01/72068 A1 | 9/2001 |
| WO | WO 01/80583 A2 | 10/2001 |
| WO | WO 02/35866 A2 | 5/2002 |
| WO | WO 03/019925 A2 | 3/2003 |
| WO | WO 2005/074430 A2 | 8/2005 |
| WO | WO 2006/014419 A1 | 2/2006 |

OTHER PUBLICATIONS

European Telecommunication Standards Institute; *European Digital Cellular Telecommunications System (Phase 2); Technical Realization of the Short Message Service (SMS) Point to Point (PP) (GSM 03.40)*; European Telecommunication Standard; Oct. 1993; Draft pr ETS 300 536; pp. 1-103.

European Telecommunication Standards Institute; *European Digital Cellular Telecommunications System (Phase 2); Technical Realization of Short Message Service Call Broadcast (SMSCB) (GSM 03.41)*; European Telecommunication Standard; Oct. 1993; Draft pr ETS 300 537; pp. 1-24.

funSMS.net; *SMS Tutorial*; pp. 1-17; http://www.funsms.net/sms_tutorial.htm.

Isochron Data Corporation; *Connect With Your Vending Machines—and Watch Your Profits Soar*; www.isochron.com/solutions_VC.htm; (2002); pp. 1-2.

Lee, William C. Y.; *Mobile Cellular Telecommunications Systems*; ISBN 0-07-037030-3; 1989; pp. 74-80.

Mouly et al.; *The GSM System for Mobile Communications*; ISBN: 2-9507190-0-7; © 1992; pp. 56-59.

TIA/EIA IS-41.5-C Standard; pp. 24, 65, 206, 207.

* cited by examiner

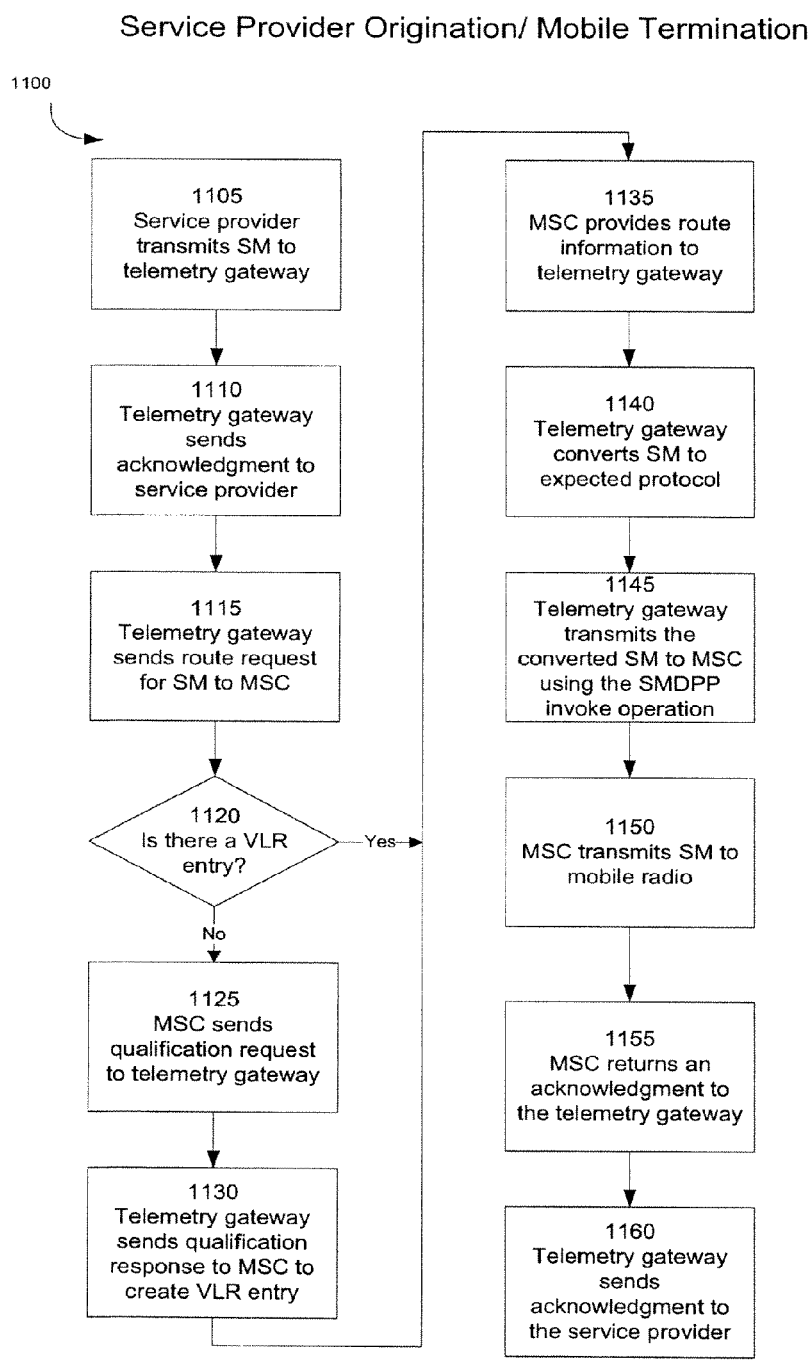

METHOD AND SYSTEM FOR EFFICIENTLY ROUTING MESSAGES

RELATED PATENT APPLICATION

This patent application claims priority to and is a continuation of the patent application entitled "Method and System for Efficiently Routing Messages," filed on Feb. 11, 2010, assigned U.S. patent application Ser. No. 12/704,290, and issued as U.S. Pat. No. 8,060,067, which is a continuation of the patent application entitled "Telemetry Gateway," filed on Jun. 12, 2007, assigned U.S. patent application Ser. No. 11/811,855, and issued as U.S. Pat. No. 7,680,505, which is a continuation of the patent application entitled "Method and System for Improved Short Message Services," filed on Jul. 6, 2004, assigned U.S. patent application Ser. No. 10/885,445, and issued as U.S. Pat. No. 7,245,928, which is a continuation-in-part of the patent application entitled "Interconnect System and Method for Multiple Protocol Short Message Services," filed on Oct. 27, 2000, assigned U.S. patent application Ser. No. 09/699,312, and issued as U.S. Pat. No. 6,856,808. Applicants hereby incorporate by reference herein the full disclosure of U.S. patent application Ser. Nos. 12/704,290 and 11/811,855 and U.S. Pat. Nos. 7,245,928 and 6,856,808.

FIELD OF THE INVENTION

The present invention relates to the exchange of short messages between a telemetry gateway and a remote location, and more particularly to eliminating delays associated with communicating short messages through conventional short message center platforms.

BACKGROUND OF THE INVENTION

Short Message Service (SMS) is an inherent capability of most digital wireless telecommunications systems. The radio technologies associated with each of the digital wireless telecommunications systems are technically incompatible at the radio signal layer, but most are compatible at the intersystem SS7 transport layer. Currently, the differing RF technologies, e.g., time division multiple access (TDMA), code division multiple access (CDMA), and global system for mobile telecommunications (GSM), have at least partial technical compatibility over the telephone industry's SS7 inter-networking system. The partial compatibility of these RF technologies is possible because the basic transport format is specified in the SS7 standard; however, many of the messaging details are implementation specific.

Even though it is possible for current short message service center platforms (SMSC) to support all of these multiple protocols, typically, an installed SMSC only supports the protocol of the cellular telecommunication system into which it is installed. For example, if the SMSC is installed into an IS136 type TDMA system, the SMSC supports only the TDMA protocol. Similarly, if the SMSC is installed into a GSM system, then the SMSC supports only the GSM protocol. In other words, although most current SMSC's can interface with any of the currently popular digital cellular systems, the SMSC's do so on an individual basis, not all simultaneously.

For example, in one network, the nodes communicate using different data formatting standards, such as integrated services digital network (ISDN) and the Japanese X.50 standard. Each of the nodes is connected to a format converter. The format converter acts as a bi-directional converter for converting between two data formats and thus allows communication between the two nodes.

The format converter reformats the data formatted in the X.50 standard into the ISDN format. The format converter accomplishes the conversion by storing the incoming X.50 data in an aligned data RAM with offsets, to provide an appropriate alignment among the frames of the data. Then, a format conversion module reformats the data into the ISDN format one byte at a time.

In another network, a subscriber in an electronic messaging network can access messages in a variety of formats. A subscriber may receive messages through a variety of types of equipment, such as a voice mail system, an e-mail system, a facsimile machine and a telephone, all connected to a wireline network. The subscriber may access these messages through a pager, a cellular telephone, or a personal digital assistant, each connected to a different wireless network. The subscriber selects the wireline or wireless network and media format to be used for delivering messages or notifying a subscriber that a message has been received.

For example, the subscriber may elect to have notification of a voice mail or facsimile receipt directed to the personal digital assistant (PDA) in the form of an e-mail message. In accordance with the method of the network, the subscriber's selection is implemented through the personal intercommunications inter-networking system, which performs the appropriate data conversion from one protocol to another and delivers the e-mail message.

In yet another network, an intelligent signaling transfer point (ISTP) is included in a telephone network with a database for storing call processing control information. Calls from one station on the network to another are either passed through or intercepted at the ISTP and screened in accordance with criteria stored in the database, such as time of day, a certain originating area or caller, or a specified call count value.

In still another network, a data collection device is provided for use with any one of the following: TDMA; CDMA; frequency division multiple access (FDMA); GSM; and personal access communications systems (PACS) technologies. But, the data collection device does not use multiple such technologies in a single system. These systems and methods only teach conversion between two specific formats.

A further limitation with conventional SMS systems is that the SMS data transmissions are handled by the SMSC. The SMSCs use the address information contained within the data transmission to communicate with Home Location Registers ("HLRs") and route the data to the correct recipient. The SMS text messages can originate and terminate at cellular mobile radiotelephones or at other external messaging entities coupled to the cellular network such as email, voicemail, and web-based messaging systems.

SMS data transmissions are routed from the SMSC to the recipient via one or more switches. Once an SMS data packet arrives at the receiving device, the message is extracted from its packet and formatted for delivery. For example, if the receiving unit is a cellular mobile radiotelephone, the unit formats the message for display on the unit's display screen. Alternatively, if the receiving unit is an external messaging system, an SMSC can format the message for transmission within an email message for delivery to a user external to the cellular telephone system.

The SMSCs are deployed by cellular carriers and serve the customers within the carrier's private network. For example, FIGS. 5 and 6 illustrate conventional SMS systems 500 and 600 using SMSCs operated by a local and regional carrier, respectively. In each of the conventional systems illustrated in FIGS. 5 and 6, the SMSCs 525 and 625 receive and store messages from radios 505 and 605. The SMSCs determine the destinations for the messages through a set of queries. Once there is available bandwidth, the SMSC can deliver the messages to the appropriate destination. SMSCs 525 and 625 can also receive messages from external systems, such as an email system, that are destined for radios 505 and 605. The SMSCs 525 and 625 query the HLRs 520 and 620 to determine the locations of the destination radios 505 and 605. Once there is available bandwidth, the SMSCs 525 and 625 can deliver the messages to radios 505 and 605. Significantly, all messages transmitted within each of systems 500 and 600 must use the same communication protocol. Conventional SMSCs 525 and 625 generally are not equipped to convert messages having different communication protocols.

FIGS. 7 and 8 illustrate conventional systems 700 and 800 for communicating roaming messages between different networks. FIG. 7 illustrates a home SMSC 730 coupled to HLR 735 that transmits messages to and receives messages from switch 715. FIG. 8 illustrates system 800 where a local SMSC 825 and an SMS clearinghouse 830 are used to communicate with a home SMSC 835. In each of systems 700 and 800, the switch or the SMSCs send a set of queries to the destination network in order to transmit messages. Furthermore, although the roaming messages are transmitted between different networks, the format of the messages is the same.

The SMSC of the conventional networks illustrated in FIGS. 5, 6, 7, and 8 acts as a "store and forward" system for the SMS data transmissions. The SMSC determines the routing for the data transmission and places the data in a queue for delivery to a cellular mobile radiotelephone or other messaging device. One shortcoming of conventional SMS systems is the delay in delivering the data transmissions queued at the SMSC. Typical delays for delivering messages can last minutes or hours.

One of the causes for the delay is that SMS messages are often assigned a lower delivery priority as compared to data transmissions containing voice communications. The low priority assigned to SMS messages stored in a queue at the SMSC causes a delay in their delivery. This delay is particularly noticeable when a carrier lacks sufficient bandwidth on its network. A further cause for delay are the inefficient steps an SMSC takes to route and deliver a data transmission. For example, the SMSC queries the HLR each time it is delivering a message to a mobile communication device. The HLR is a database of profiles for subscribers comprising account and service information.

Accordingly, there is a need in the art for a system that can efficiently route SMS messages from originators to recipients. Specifically, there is a need in the art to communicate more efficiently with serving switches and avoid the delays caused by an SMSC. A communication platform is needed that delivers messages promptly instead of storing them for later delivery when there is available bandwidth. The needed communication platform should also eliminate unnecessary steps as part of the communication process. There is a further need for a communication platform that can communicate with remote stations that use different digital cellular or personal communication formats.

SUMMARY OF THE INVENTION

The method and system disclosed herein is capable of efficiently routing messages without the delay typically associated with conventional technology. In an exemplary embodiment, a telemetry gateway can perform certain functions of conventional SMS systems to support the delivery of communications from incompatible networks. The telemetry gateway may communicate over a SS7 inter-networking system. It further may convert and forward messages without performing a store and forward process as required by conventional technology.

In an exemplary embodiment, a telemetry gateway can receive a message from a radio communication device; convert the message from one of several standard messaging protocols to a protocol compatible with a second communication device, such as a message service provider; and transmit the message to the second communication device. This transmission can be performed by the telemetry gateway without the store and forward delay associated with conventional technology.

In another exemplary embodiment, the telemetry gateway may receive a message from a communication device, such as a service provider; query a MSC for routing information for the message; convert the message to one of at least three different formats; and transmit the message to the MSC for delivery to a recipient without the use of a store and forward process. The recipient may be a radio communication device or other mobile device.

In a further exemplary embodiment, a short message arbitrator may provide efficient and rapid delivery of a short message. The short message arbitrator can receive a message from a first device for delivery to a second device; access a database containing a profile for the first device and the second device; analyze whether the first device and the second device communicate using incompatible data formats; and if so, convert the message at the short message arbitrator from the first format to one of at least three different data formats.

Once the message is converted, the short message arbitrator can forward the message for receipt by the second device. The step of analyzing whether the first device and the second device communicate use incompatible data formats may be performed by determining a mobile switch center for the second device; determining a class of service for the first device; determining a class of service for the second device; and determining a type of transport to use between the short message arbitrator and the second device. By determining these features, the short message arbitrator can properly prepare the message for delivery by converting the incompatible data format into a format compatible with the second device.

The above and other aspects of the system and method will be described below in connection with the drawing set and the appended specification and claim set.

BRIEF DESCRIPTION OF THE DRAWINGS

FIG. 11A is a flow diagram illustrating an exemplary communications method for a message terminating at a mobile radio.

DETAILED DESCRIPTION OF THE EXEMPLARY EMBODIMENTS

The present invention is directed to a system and method for communicating among digital cellular systems of multiple formats. A telemetry gateway allows external messaging systems to send short messages to and receive short messages from multiple remote locations using different digital cellular or PCS standards. The telemetry gateway can convert inbound short messages from the typical communication formats used in conventional wireless networks to a common telemetry protocol for forwarding to external messaging service providers. The telemetry gateway can convert outbound short messages from the common telemetry protocol to the format of the destination radio communication device. The telemetry gateway also performs certain functions of conventional SMSCs and HLRs to provide for faster and more efficient delivery of short messages.

The present invention can be implemented in a variety of different embodiments. The first exemplary embodiment described herein uses a short message arbitrator ("SMA") to intercept, convert, and transmit messages of varying formats. The second exemplary embodiment described herein uses the telemetry gateway which is capable of both converting short messages of different formats as well as transmitting and receiving messages more quickly and efficiently than conventional SMS systems.

Exemplary SMA Embodiment

Figure 1:
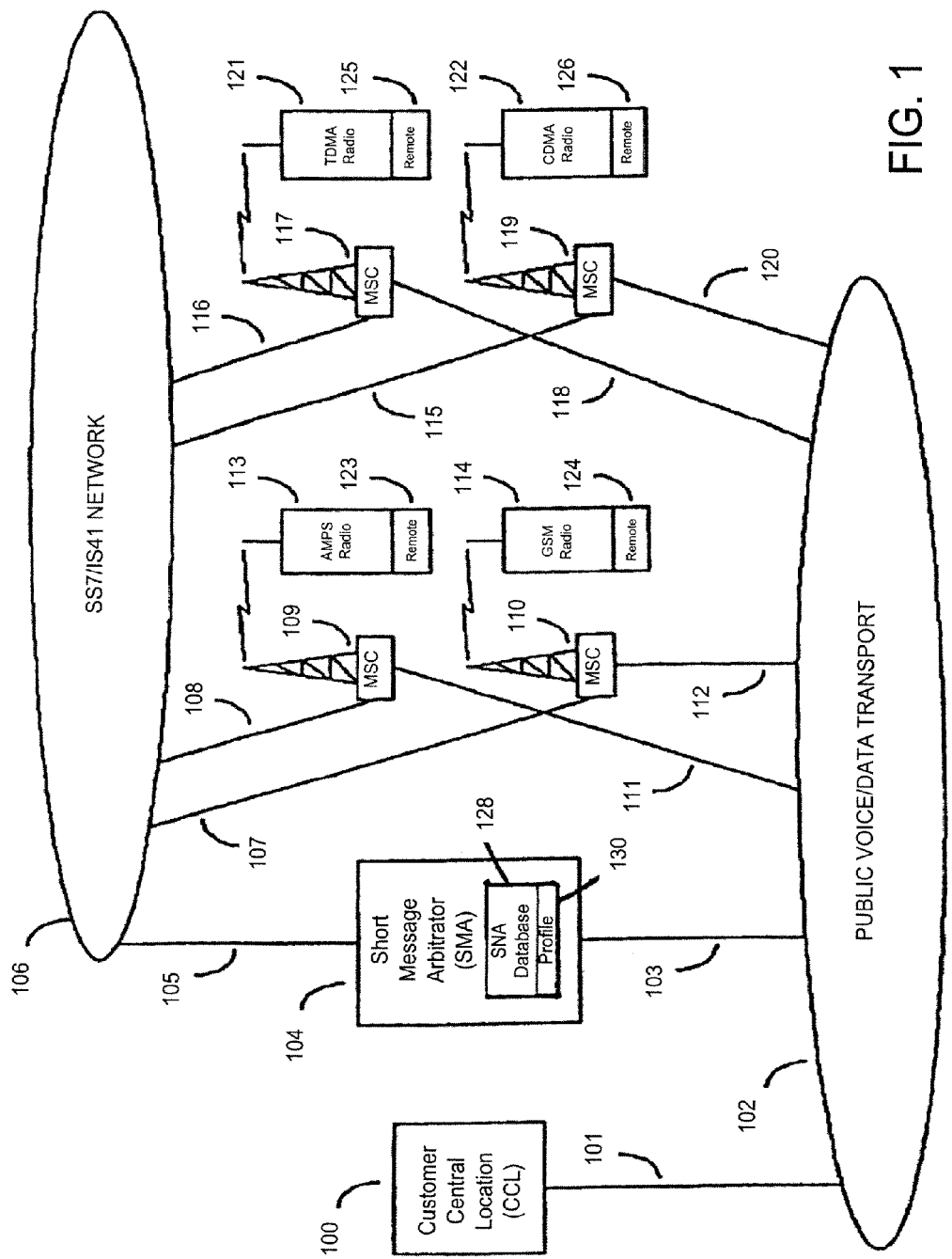
FIG. 1 is a block diagram of an interconnect system according to an exemplary embodiment of the present invention.

FIG. 1 shows an exemplary system for providing a flexible bi-directional data transport between a CCL 100 and one or more remote locations using wireless technologies. The CCL 100 sends and receives data to and from remote locations 123, 124, 125 and 126. Data from the CCL 100 is transferred to the SMA 104 using a public voice/data transport 102 over data circuits 101 and 103.

The SMA 104 converts the CCL's data to the proper format for transport to MSC's 109, 110, 117 and 119. The SMA 104 utilizes two routes for delivering the CCL's data to MSC's 109, 110, 117, and 119. The SMA 104 routes the CCL's data to one of the MSC's 109, 110, 117, and 119 by: 1) using a data circuit 105 to an SS7/IS41 Network 106, then over a data circuit (107, 108, 115 or 116) to the MSC (109, 110, 117, or 119) that is intended to receive the transmitted data; or 2) using a data circuit 103 back to the public voice/data transport 102, then over a data circuit (111, 112, 118, or 120) to the MSC (109, 110, 117, or 119) that is intended to receive the transmitted data.

Depending on the wireless access method used at the remote location, the CCL's data is routed to the selected wireless market. For advanced mobile phone service (AMPS) wireless communications, the data is transported from the MSC 109 to an AMPS radio 113 and finally to the remote location 123. For time division multiple access (TDMA) wireless communications, the data is transported from the MSC 117 to a TDMA radio 121 and finally to the remote location 125. For code division multiple access (CDMA) wireless communications, the data is transported from the MSC 119 to a CDMA radio 122 and finally to the remote location 126. For global system for mobile telecommunications (GSM), the data is transported from the MSC 110 to a GSM radio 114 and finally to the remote location 124.

The system of FIG. 1 provides for the bi-directional transport of data between a CCL 100 and its remote locations (123, 124, 125, or 126) using a wireless link (Cellular or PCS). The CCL 100 can use one or more methods to deliver data to the SMA 104. The various methods employ a variety of communication system is components. Below are four examples:

1) a dial-up data connection via a voice circuit 101 to the public voice/data transport 102 (public switched telephone network), then over the voice circuit 103;

2) a dial-up or dedicated data circuit 101 to the public voice/data transport 102 (Internet) then over the data circuit 103;

3) a dedicated data circuit 101 to public voice/data transport 102 (frame-relay private network) then over the data circuit 103; and 4) an ISDN circuit 101 to public voice/data transport 102 (public switched telephone network), then over the ISDN circuit 103.

After the SMA 104 receives the data from the CCL 100, it uses an identifying characteristic, such as the mobile identification number (MIN) or international mobile station identifier (IMSI), that was received with the data, to retrieve the CCL's profile 130 from a SMA database 128. The SMA determines the following from the CCL profile: 1) the MSC (109, 110, 117, or 119) serving the remote radio (113, 114, 121 or 122); 2) the wireless access method used in the MSC's market; 3) the CCL's class of service; and 4) the type of transport to use between the SMA 104 and the selected MSC (109, 110, 117, or 119). Based upon the information retrieved from the database, the SMA determines whether any alterations are required to the data or identifying characteristic to make the data compatible with a technologically dissimilar receiving unit or system.

The CCL's class of service may include one of the following: "CELLEMETRY" data service; short message system (SMS); asynchronous digital data; or data over circuit switched voice cellular. "CELLEMETRY" data service is available to AMPS (analog and digital) radios, SMS and asynchronous digital data are available to digital radios (CDMA, GSM and TDMA), and circuit switched voice cellular is available in all methods of wireless access. In addition, those skilled in the art will appreciate that other classes of service may be used with the CCL 100 of the present invention.

For simplicity only one CCL 100 is illustrated in FIG. 1. However, the SMA can support multiple CCL's. Each CCL served by the SMA has a CCL identifier that is stored in the database.

Figure 2:
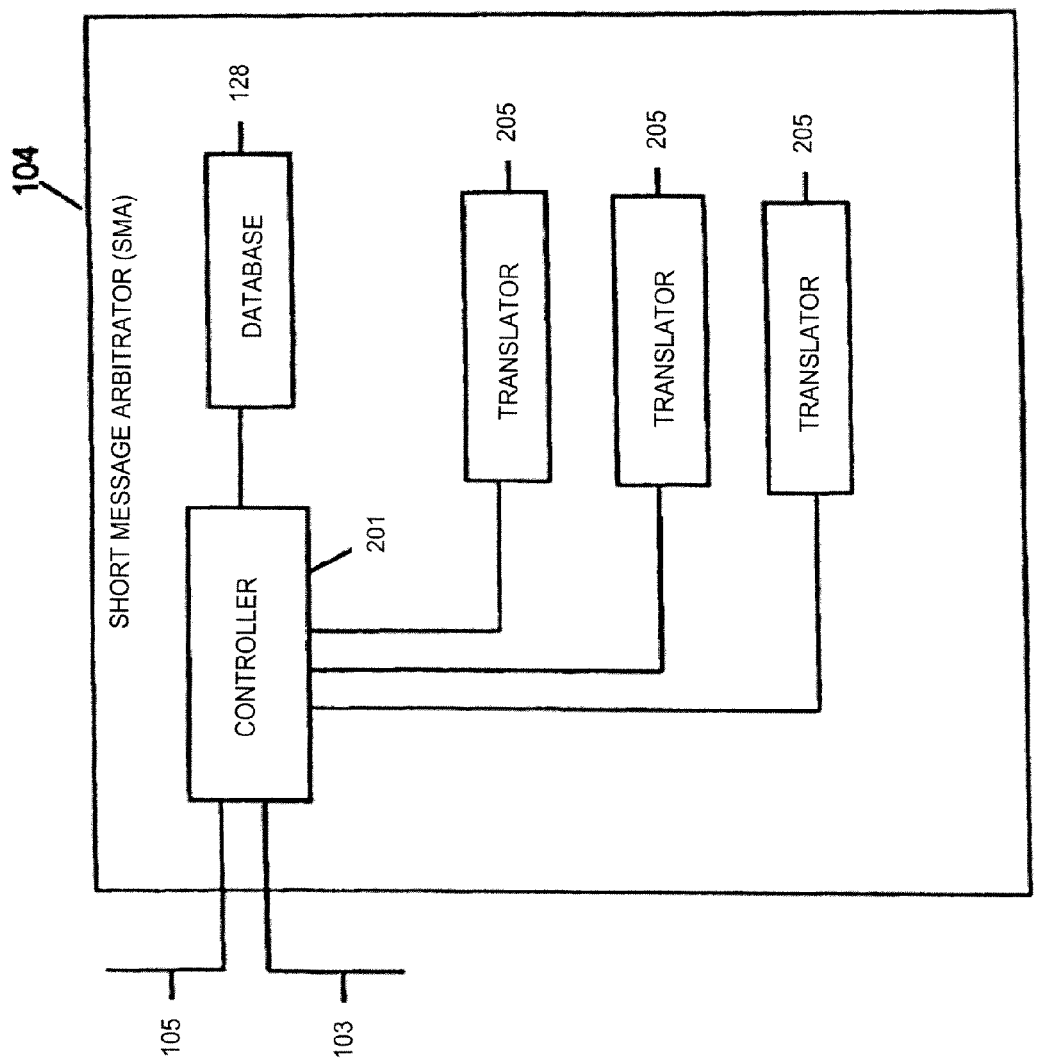
FIG. 2 is a block diagram of an exemplary short message arbitrator of the system illustrated in FIG. 1.

FIG. 2 shows an exemplary SMA 104 of the present invention. The controller 201 manages communication over the data circuits 103 and 105. The SMA database 128 (FIG. 1) stores a profile for each CCL 100 supported by the SMA 104. The profile provides information to support the conversion and transport of data between a central location, such as CCL 100, and its remote locations, such as remote locations 123, 124, 125, and 126. From the stored profiles the SMA determines the recipient of the communication, as well as the method of data transport and any data conversions that are necessary.

The SMA analyzes the information about the CCL and the remote device stored in the database to determine whether the CCL and the remote are using compatible or incompatible data formats. If the CCL and the remote are using incompatible data formats, then the SMA converts the data. As will be apparent to one skilled in the art, the conversion from one data format into another can be managed in any suitable way, e.g., through multiple bi-directional translators 205.

Exemplary Communication Methods with the SMA

Figure 3:
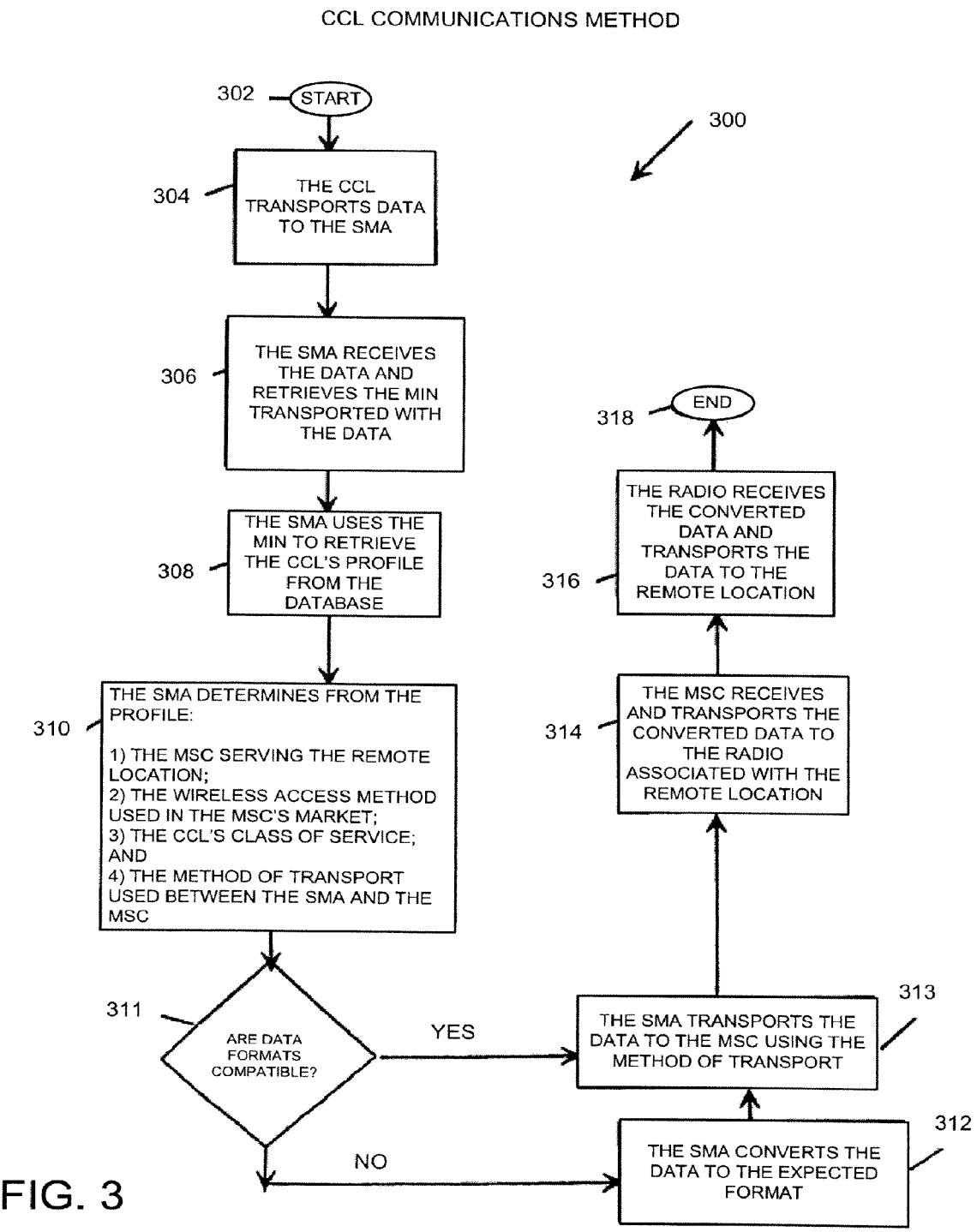
FIG. 3 is a flow diagram illustrating an exemplary communications method used by the CCL to transmit data to the remote locations.
Figure 4:
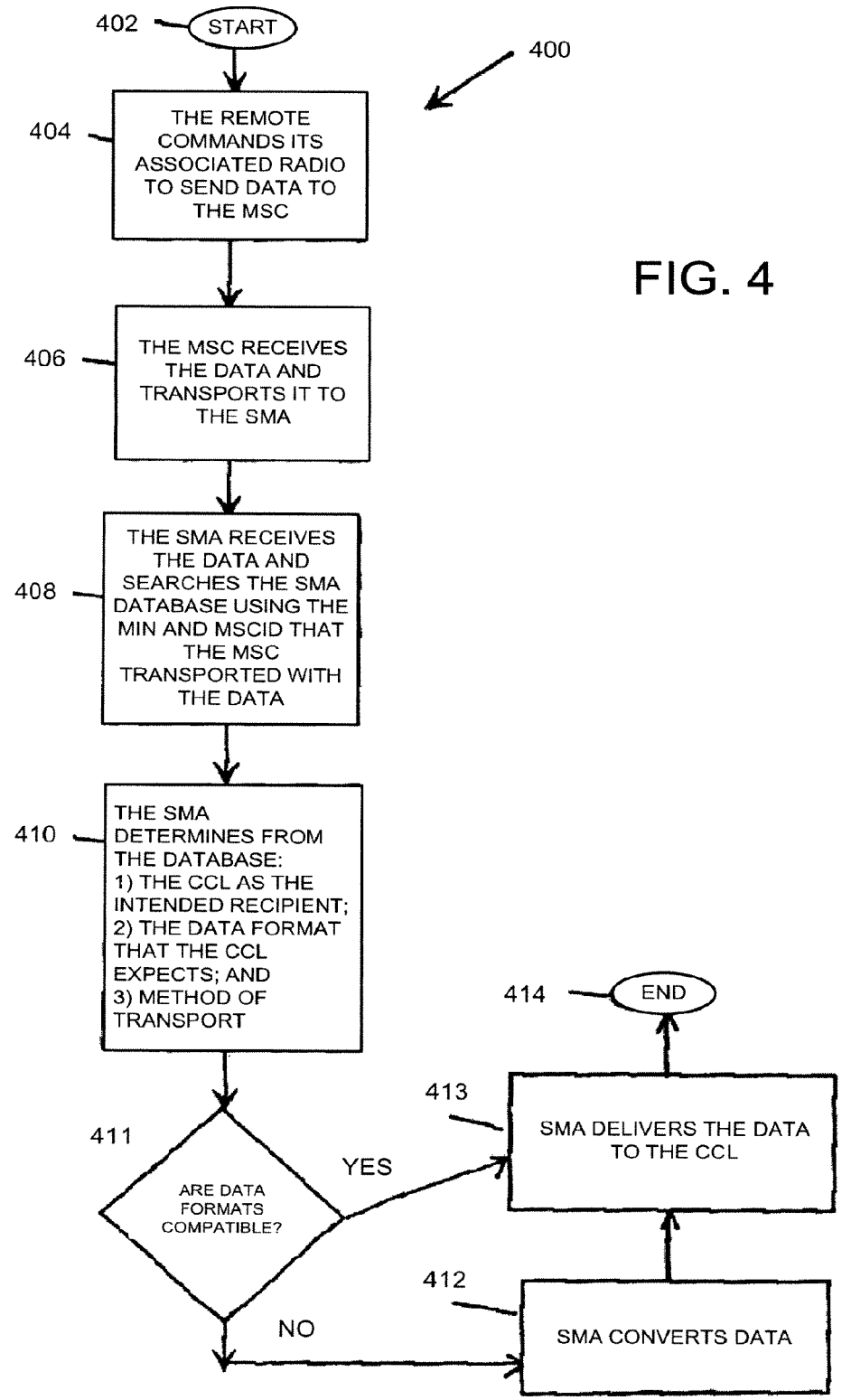
FIG. 4 is a flow diagram illustrating an exemplary communications method used by the remote locations to transmit data to the CCL.
Figure 5:
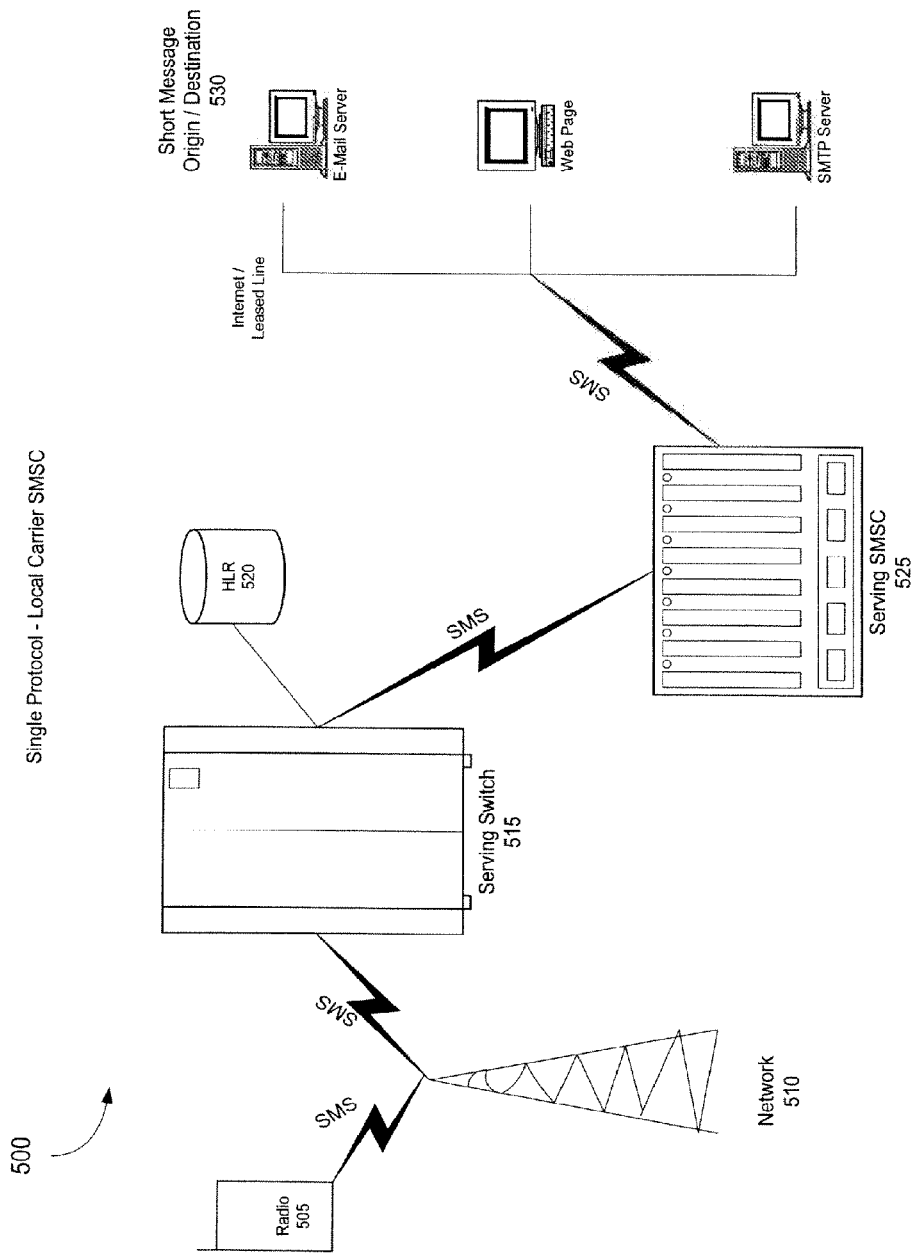
FIG. 5 is a block diagram illustrating a prior art system for communication using a local carrier SMSC.
Figure 6:
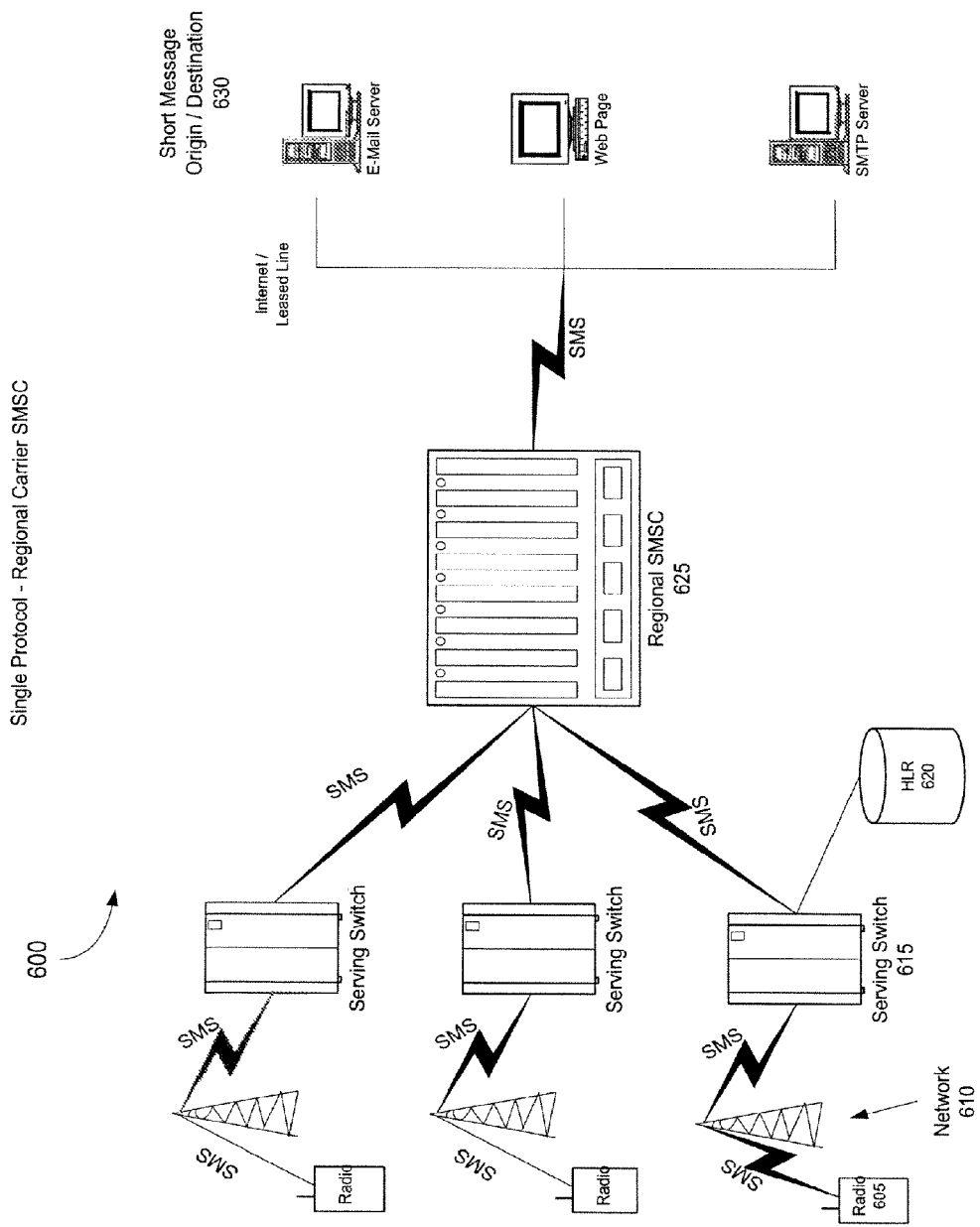
FIG. 6 is a block diagram illustrating a prior art system for communicating using a regional carrier SMSC.
Figure 7:
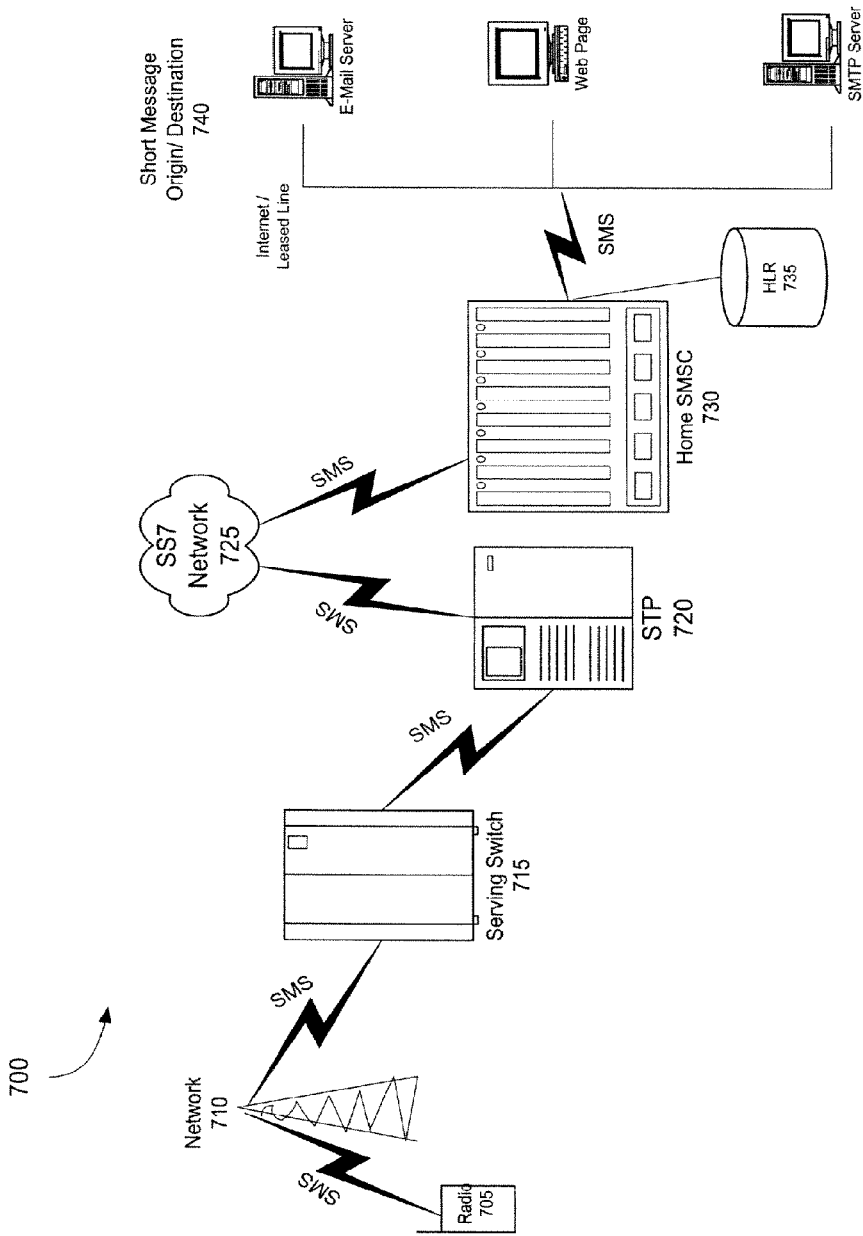
FIG. 7 is a block diagram illustrating a prior art system for communicating where a home carrier has a direct roaming agreement with a local carrier.
Figure 8:
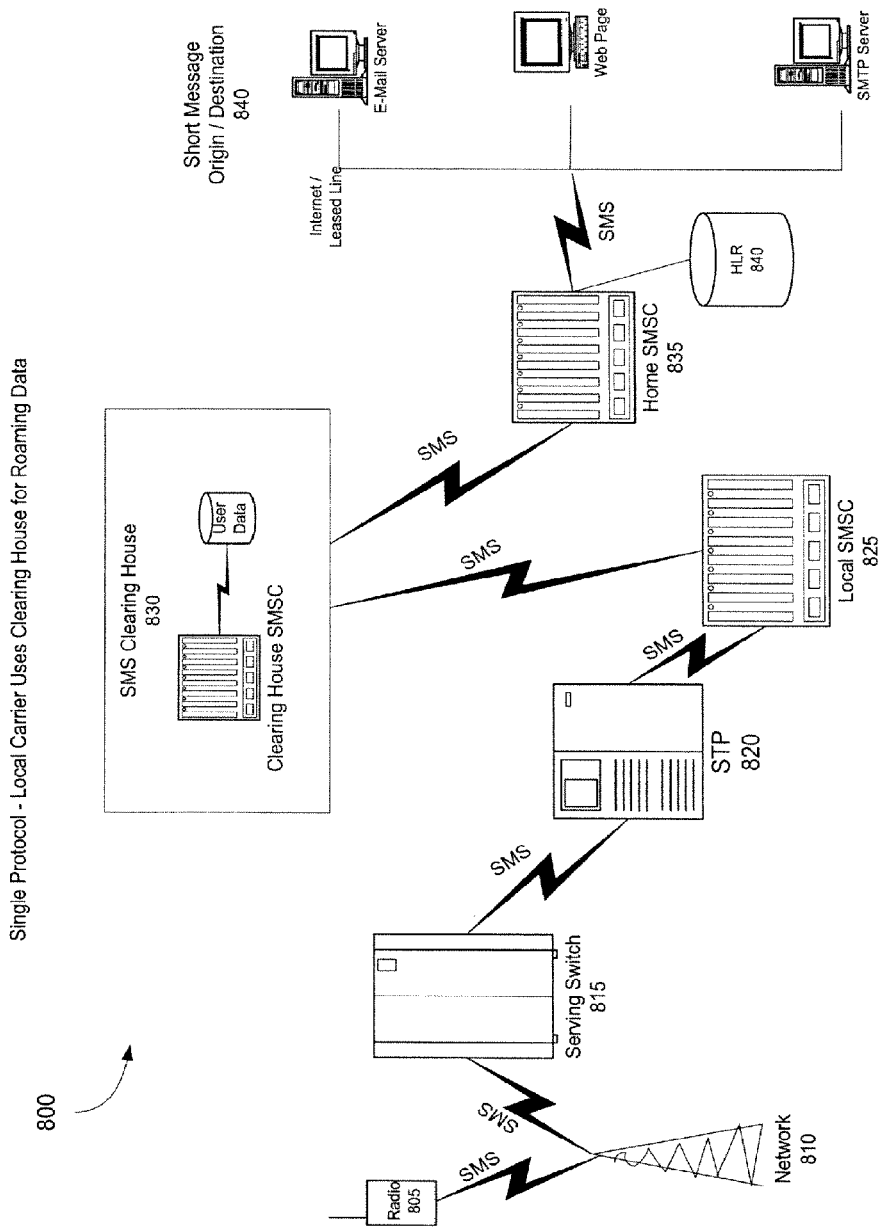
FIG. 8 is a block diagram illustrating a prior art system for communicating where a local carrier uses a clearing house SMSC for roaming data.

FIGS. 3 and 4 are flow diagrams illustrating exemplary communication methods of the present invention. These figures illustrate the communication methods utilized to transfer data between the customer central location (CCL) 100 and the remote locations (123, 124, 125, and 126) of FIG. 1. The communication methods of FIGS. 3 and 4 allow the remote locations (123, 124, 125, and 126) and CCL 100 to communicate, even though they are connected by multiple wireless (e.g. digital cellular and PCS) systems using multiple, otherwise incompatible protocols or data formats. In discussing the following flow diagrams, reference will be made to the elements of FIG. 1.

FIG. 3 is a flow diagram illustrating the communications method 300 used by the CCL 100 to transfer data to a remote location (123, 124, 125, or 126). Communications method 300 begins at step 302 and proceeds to step 304. At step 304, the CCL 100 transports the data to SMA 104. The SMA 104 at step 306 receives the data and retrieves the MIN, or other identifying characteristic, transported with the data. At step 308, the SMA 104 uses the MIN to retrieve the CCL's profile 130 from the SMA database 128.

From the profile 130, the SMA 104 determines the MSC (109, 110, 117, or 119) that is serving the remote radio (113, 114, 121 or 122) identified by the MIN, the wireless access method or data format used in the MSC's market, the class of service or data format used by the CCL, and the method of transport to use between the SMA 104 and the selected MSC (109, 110, 117, or 119), in step 310. In step 311, the SMA determines whether the data formats used by the CCL and the remote are compatible. If the data formats are compatible, then the Yes branch is followed to step 313. However, if the data formats are not compatible, then the No branch is followed to step 312. At step 312, the SMA 104 converts the data to the proper format.

At step 313, the SMA transports the data to the appropriate MSC (109, 110, 117, or 119) using the method of transport specified in the database. Proceeding to step 314, the MSC (109, 110, 117, or 119) receives and transports the data to the radio (113, 114, 121, or 122) associated with the remote location (123, 124, 125, or 126). Communications method 300 then proceeds to step 316. At step 316, the radio (113, 114, 121, or 122) receives the converted data and transports it to the remote location (123, 124, 125, or 126). Finally, communications method 300 proceeds to step 318 and the method ends.

FIG. 4 is a flow diagram illustrating an exemplary remote communications method 400 used by the remote locations (123, 124, 125, or 126) to transfer data to the CCL 100. The remote communications method 400 illustrates the steps used by a remote location (123, 124, 125, or 126) to transport data to the CCL 100. Remote communications method 400 begins at step 402 and proceeds to step 404. At step 404, the remote location (123, 124, 125, or 126) commands its radio (113, 114, 121, or 122) to send data to its associated MSC (109, 110, 117, or 119). At step 406, the MSC (109, 110, 117, or 119) receives the data and transports it to the SMA 104.

The remote communications method 400 then proceeds to step 408. At step 408, the SMA 104 receives the data and retrieves the identifying characteristics, such as the MIN (or IMSI) and MSC identifier (MSCID), from the data. The SMA 104 searches the SMA database 128 using the MIN and MSCID that the MSC (109, 110, 117 or 119) transported with the data. Next, at step 410, the SMA 104 determines from the SMA database 128: 1) the CCL identifier; 2) the class of service used by the identified CCL 100; and 3) the wireless access method used by the MSC.

The SMA compares the class of service used by the CCL and the wireless access method used by the MSC to determine whether the data formats are compatible in step 411. If the data formats are compatible, then the Yes branch is followed to step 413. However, if the data formats are incompatible, then the No branch is followed to step 412 and the data is converted. Once the data is converted, the method proceeds to step 413. In step 413, the SMA delivers the data to the CCL. The SMA delivers the data to the CCL using a transmission path that is appropriate for the CCL identified by the CCL identifier. Then, remote communications method 400 proceeds to step 414 and ends.

Exemplary Communications with the SMA

The following examples are exemplary communications supported by the present invention. These examples are intended to illustrate some of the possible communication schemes, between the CCL 100 and the remote locations (123, 124, 125, and 126), that may be implemented with the present invention. These examples are in no way intended to limit the scope of the invention. Those skilled in the art will appreciate that there are many other possible schemes and protocols that may be implemented with the present invention.

In a first example, the CCL 100 sends data to the remote location 123. The remote location 123 is associated with an AMP's radio 113 and the AMP's radio is served by MSC 109. The CCL's class of service is "CELLEMETRY" Data Service. The CCL 100 sends the MIN of the AMPS radio 113 along with the data to be transported to the SMA 104. The SMA 104 determines from the SMA database 128 that the MIN corresponds to the AMP's radio 113; the class of service is "CELLEMETRY" Data Service; and the MSC 109 serves the radio 113.

Depending on the type of mobile switching center, either an IS41 inter-system page message is sent from the SMA 104 to the MSC 109 through data circuit 105, the SS7/IS41 network 106 and the data circuit 108; or a roamer-access call is made from the SMA 104 to the MSC 109 through circuit 103, public voice/data transport 102 and the data circuit 111. The SMA determines the appropriate method of transport between the SMA 104 and the MSC 109 from the database 128. The MSC 109 then broadcasts a page order, which is received by the AMPS radio 113 and delivered to the remote location 123 to complete the transaction.

In another example, the remote location 123 sends data to the CCL 100. The remote location 123 is associated with the AMP's radio 113 and the AMP's radio is served by MSC 109. The remote location 123 sends a message to the CCL 100 by commanding the AMPS radio 113 to generate a regeneration notification that is received by the MSC 109. The MSC 109 then forwards the regeneration notification to the SMA 104, via the data circuit 108, the SS7/IS41 network 106 and the data circuit 105. Once the SMA 104 receives the notification, the SMA 104 searches the SMA database 128, using the MIN and the MSCID provided by the MSC 109. From the database 128, the SMA 104 determines the following: 1) the CCL identifier for the intended recipient; 2) the class of service used by the CCL; and 3) and the wireless access method used by MSC 109. The SMA 104 compares the class of service used by the CCL 100 and the wireless access method used by MSC 109 to determine whether the data needs to be converted. If so, the SMA 104 converts the data. The data is delivered to the CCL 100 using the data circuit 103, public voice/data transport 102 and the data circuit 101.

In a further example, the CCL 100 sends data to the remote location 125. The remote location 125 is associated with a TDMA radio 121 and the TDMA radio is served by MSC 117. The CCL 100 sends the MIN of the TDMA radio 121 along with the data to the SMA 104. The SMA 104 determines from the SMA database 128 that the MIN corresponds to the TDMA radio 121; short message system (SMS) is the class of service; the MSC 117 serves the radio 121, and the method of transport between the SMA and the MSC 117. In this example, the method of transport is via data circuit 105 and SS7/IS41 network 106. Once this information is retrieved, the SMA 104 sends an IS41 SMS message to the MSC 117 through data circuit 105, the SS7/IS41 network 106, and data circuit 116. Then, MSC 117 sends a SMS message to radio 121, which in turn delivers the data to remote location 125 to complete the transaction.

In a further example, the remote location 125 sends data to the CCL 100. The remote location 125 is associated with the TDMA radio 121 and the TDMA radio is served by MSC 117. The remote location 125 commands the TDMA radio 121 to originate an SMS message, which is received by the MSC 117 and transported to the SMA 104. The SMS message is transported to the SMA 104 through circuit 116, the SS7/IS41 network 106 and, the data circuit 105. The SMA 104 then searches the SMA database, using the MIN and the MSCID provided by the MSC 117, and determines: the CCL identifier; the class of service used by the CCL identified by the CCL identifier; and the wireless access method used by the MSC 117. The SMA 104 compares the class of service used by the CCL 100 and the wireless access method used by the MSC 117 to determine whether the data needs to be converted. If so, the SMA 104 converts the data. The data is then delivered to the CCL 100 using the data circuit 103, the public voice/data transport 102 and the data circuit 101.

In yet a further example, the CCL 100 wishes to send data to the remote location 126. The remote location 126 is associated with a CDMA radio 122 and the CDMA radio is served by MSC 119. The CCL 100 sends the MIN of the CDMA radio 122 along with the data to be transported to the SMA 104. The SMA 104 determines from the SMA database 128 that the MIN corresponds to the CDMA radio 122; asynchronous digital data is the class of service; that the MSC 119 serves the CDMA radio 122; and that the method of transport from the SMA 104 to the MSC 119 is via data circuit 103 and public voice/data transport 102. Once this information is retrieved, a data message is sent from the SMA 104 to MSC 119. The message is sent through data circuit 103, public voice/data transport 102, and the data circuit 120. The data message is then sent by the MSC 119 to the CDMA radio 122, which in turn sends the data message to the remote location 126 to complete the transaction.

In a final example, the remote location 126 wishes to send data to the CCL 100. The remote location 126 is associated with a CDMA radio 122 and the CDMA radio is served by MSC 119. The remote location 126 requests that CDMA radio 122 initiate an asynchronous digital data call, which is received by the MSC 119 and transported to the SMA 104. The MSC 119 transports the data call via the data circuit 120, the public voice/data transport 102, and data circuit 103. The SMA 104 then searches the SMA database 128, using the MIN and the MSCID provided by the MSC 119, and determines: the CCL identifier for the intended recipient; the class of service used by the intended recipient; and the wireless access method used by the MSC 119. The SMA 104 compares the class of service used by the CCL 100 and the wireless access method used by the MSC 119 to determine whether the data needs to be converted. If so, the SMA 104 converts the data. The data is then delivered to the CCL 100 using the data circuit 103, the public voice/data transport 102 and the data circuit 101.

While a preferred embodiment has been set forth above, those skilled in the art who have reviewed the present disclosure will readily appreciate that other embodiments can be realized within the scope of the present invention. For example, transmission between the CCL 100 and the SMA 104 can take place through any suitable network, such as a TCP/IP Network. Also, any SMS protocol can be used.

Exemplary Telemetry Gateway Embodiment

In an alternate embodiment, the present invention can be implemented using a telemetry gateway. A telemetry gateway comprises hardware and software modules capable of communicating messages to MSCs in various digital networks. The telemetry gateway can perform certain functions of an HLR and SMSC found in conventional SMS systems, as illustrated in FIGS. 5-8. Replacing the HLR and the SMSC used in conventional SMS systems allows the telemetry gateway to provide faster and more efficient routing of messages. Specifically, instead of the "store and forward" functions performed by the SMSC that typically cause a lag of minutes or hours in the transmission of messages, the telemetry gateway does not store the messages it receives. The telemetry gateway typically processes and transmits messages in milliseconds. The telemetry gateway is more efficient than conventional SMS systems because it considers all messages as roaming and eliminates the need to query the HLR before sending a message to a mobile communication device. The telemetry gateway offers a further advantage over a conventional SMSC in that it also has the ability to convert messages having different messaging protocols.

Figure 9:
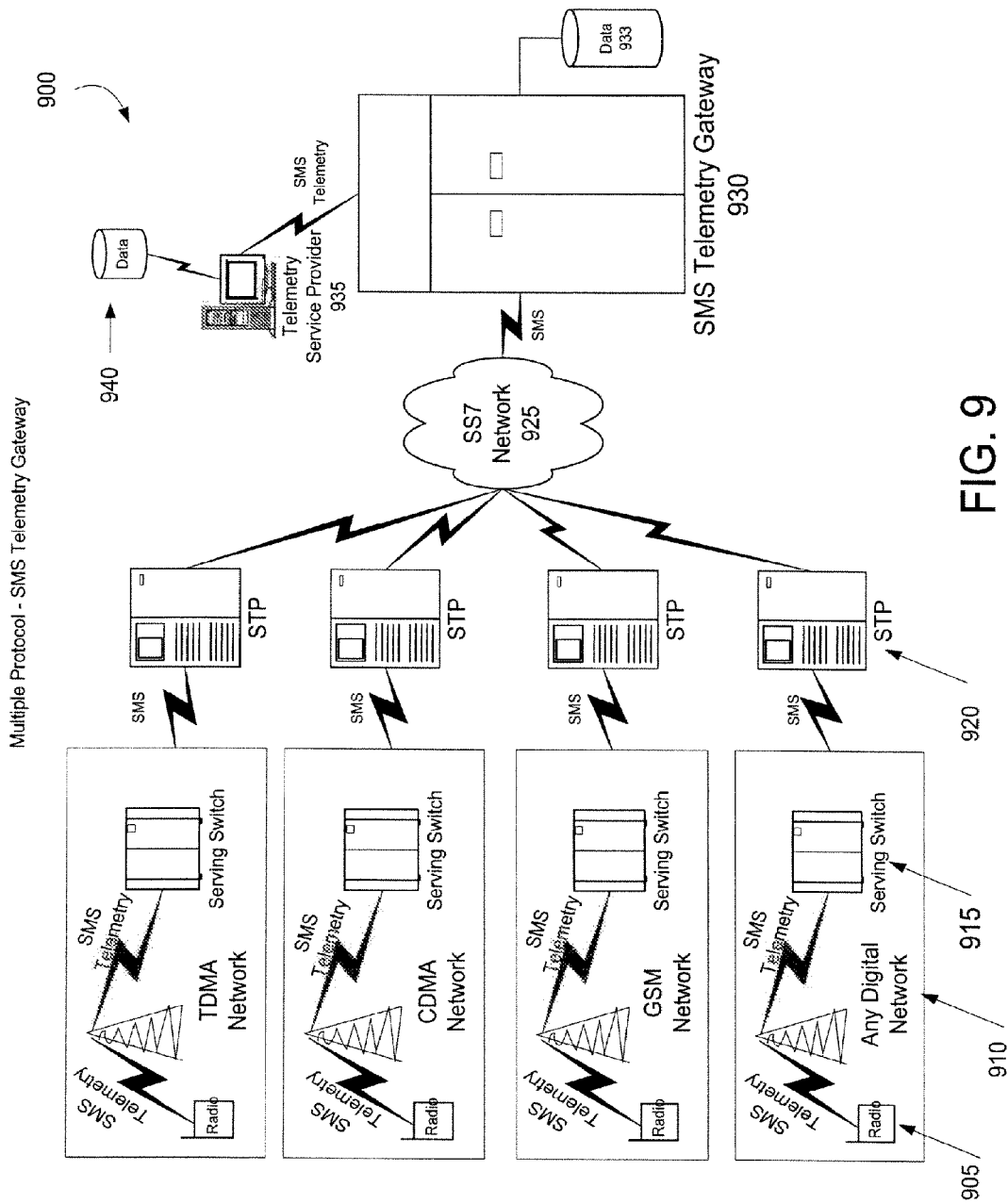
FIG. 9 is a block diagram illustrating a system for communicating using a telemetry gateway according to an exemplary embodiment of the present invention.

Referring to FIG. 9, an exemplary architecture 900 is illustrated for implementing an SMS telemetry gateway 930. In the exemplary architecture 900, the SMS telemetry gateway 930 can communicate with digital networks using a variety of different wireless access formats. While exemplary architecture 900 illustrates a TDMA network, a CDMA network, and a GSM network, those skilled in the art will understand that the invention is not limited to these examples of digital networks. Similarly, while the SMS telemetry gateway 930 is shown coupled to a telemetry service provider 935, the present invention is not limited to a single service provider. The SMS telemetry gateway can communicate with service providers supporting a variety of external messaging systems including email, voicemail, paging, and Web-based messaging.

Turning to the general digital network 910, a cellular mobile radiotelephone, or radio, 905 can transmit a message via the network 910 to the MSC, or serving switch, 915. The radio 905 may be a fixed or mobile radio communication device. The serving switch 915 determines that the message is a roaming communication and transmits the message to signal transfer point 920 for routing to the SMS telemetry gateway 930 via SS7 network 925. Although the SS7 network 925 is the method for transmission to the SMS telemetry gateway 930 in the preferred embodiment illustrated in FIG. 9, other data networks can also perform the same function. Upon receipt of the message, the SMS telemetry gateway 930 converts the message to a common telemetry protocol and determines the destination service provider 935 from the message's address field. The SMS telemetry gateway 930 can also conform the converted message to any delivery preferences for the service provider 935 stored in database 933. For example, an alternate network address for the service provider 935 may be stored in database 933.

Once the delivery preferences are conformed, the SMS telemetry gateway 930 transmits the message in the common protocol to the appropriate service provider 935. In contrast to the SMSC of conventional SMS systems, the SMS telemetry gateway 930 does not store the message for later delivery. Instead, the SMS telemetry gateway 930 transmits the message to the service provider 935 as soon as the processing steps are completed. The SMS telemetry gateway typically processes and transmits messages in a few milliseconds as opposed to the minutes or hours of delay with conventional SMS systems.

When the service provider 935 receives the telemetry message, it can package the message for its subscribers in a variety of formats. For example, the service provider 935 can insert the message into an email for delivery to an email system. In another embodiment, the service provider 935 can use the message to create a voicemail which is forwarded to the subscriber. The service provider 935 can also transmit a confirmation that the message was received to the SMS telemetry gateway 930.

The SMS telemetry gateway 930 is a bidirectional system that can also transmit messages from the service provider 935 to radio 905. When the SMS telemetry gateway 930 receives a message from the service provider 935, it requests routing information from the switch 915 at the destination network 910. The SMS telemetry gateway 930 converts the message to the wireless access format used at the destination network 910 and transmits the message.

The SMS telemetry gateway's 930 direct access to the SS7 network 925, as illustrated in exemplary architecture 900, allows for faster and more efficient communication of short messages. Furthermore, its ability to convert messages from a variety of different wireless access formats enables communication with a greater number of networks.

Exemplary Communication Methods with the Telemetry Gateway

Figure 10A:
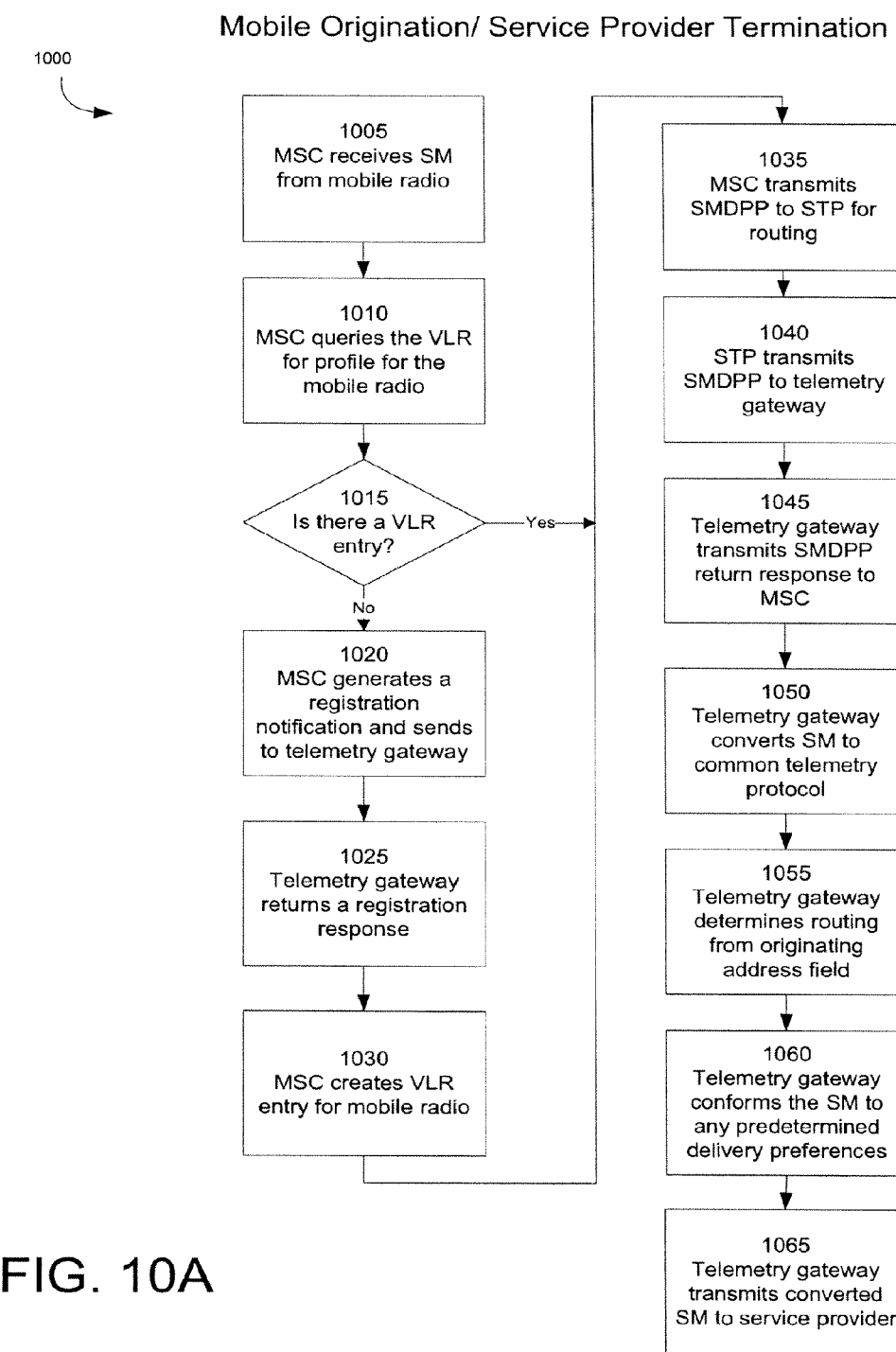
FIG. 10A is a flow diagram illustrating an exemplary communications method for a message originating at a mobile radio.

FIGS. 10A and 11A illustrate exemplary methods for communicating messages using the SMS telemetry gateway 930 in accordance with an exemplary embodiment of the present invention. FIG. 10A illustrates an exemplary communication method for a message originating at a mobile radio, whereas FIG. 11A is an example of a method for a mobile radio terminating message. Those skilled in the art will recognize that the methods illustrated in FIGS. 10A and 11A are only examples and that other messaging techniques can be implemented in other embodiments using the SMS telemetry gateway.

Figure 10B:
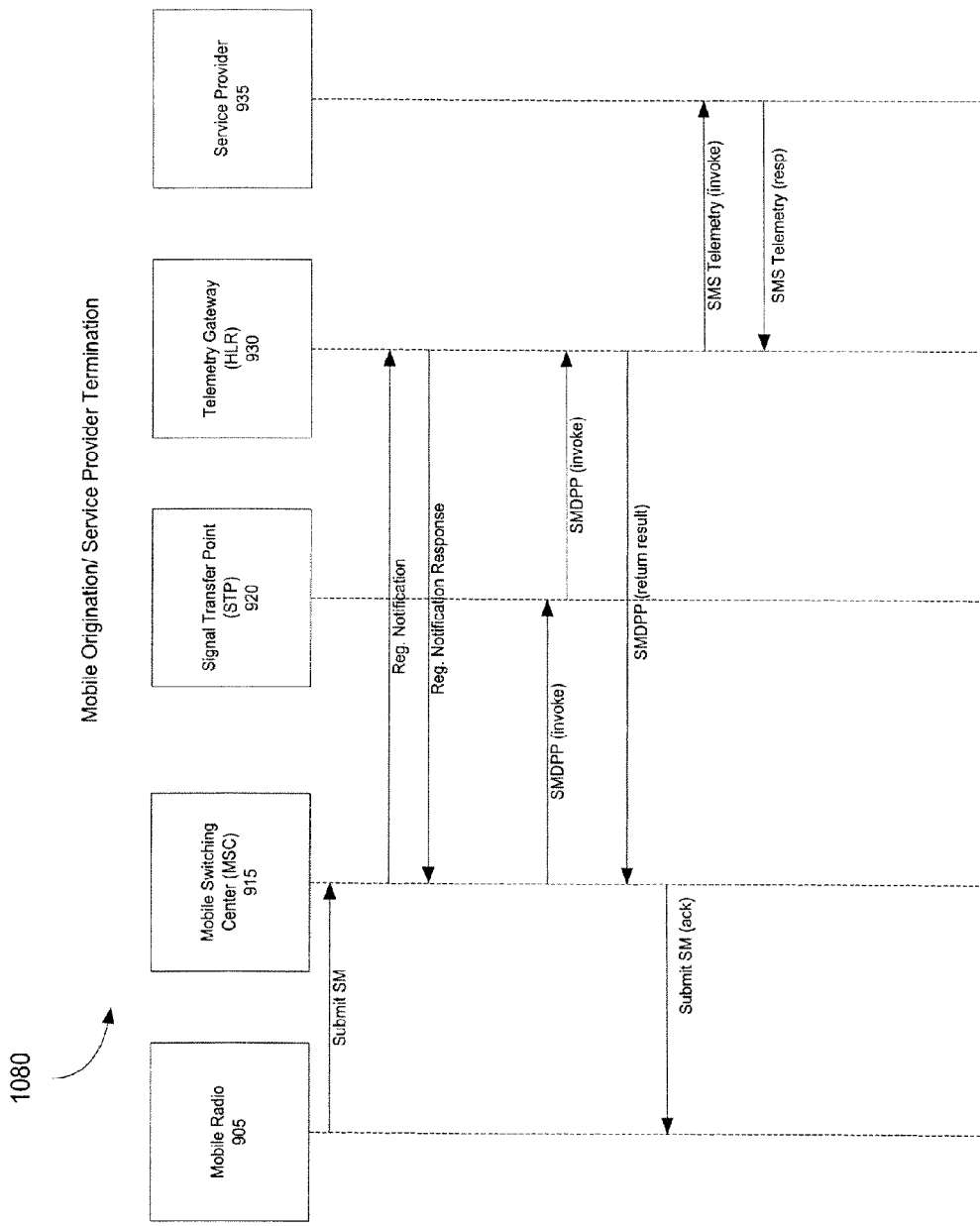
FIG. 10B is a ladder diagram illustrating the sequence of communications for a message originating at a mobile radio as described in FIG. 10A according to an exemplary embodiment of the present invention.

Referring to FIG. 10A, exemplary method 1000 is illustrated for transmitting a message originating at a mobile radio. The sequence of steps performed in exemplary method 1000 are also shown in exemplary ladder diagram 1080 illustrated in FIG. 10B. Referring to exemplary method 1000, the switch 915 receives a message, or "SM", from the radio 905 in step 1005. The switch queries its visitor location register ("VLR") in step 1010 to locate a profile for the radio 905. The VLR is a database comprising temporary information about subscribers of one network that are roaming into another network. The switch uses the information in the VLR to complete roaming communications.

If there is no entry in the VLR database in step 1015, the switch 915 sends a registration notification to the telemetry gateway 930 to obtain account and service information for the subscriber. The switch 915 receives the registration response with the needed information from the SMS telemetry gateway 930 in step 1025 and creates a profile in the VLR database in step 1030. The terms "registration notification" and "registration response" are used herein to refer to general steps for identifying the radio communications device. These terms do not limit the invention to particular types of networks or protocols.

Alternatively, if a VLR entry already exists in step 1015, the switch 915 can proceed directly to step 1035 and transmit the message to the signal transfer point 920 for routing to the SMS telemetry gateway 930 in step 1040. A characteristic of SMS communications includes guaranteed delivery of messages through the use of confirmation messages. For example, when the SMS telemetry gateway 930 receives the message, it returns a confirmation response to the switch 915 in step 1045. In step 1050, the SMS telemetry gateway converts the received message from the protocol used at the originating network 910 to the common telemetry protocol used by the service provider 935.

In steps 1055 and 1060 of exemplary method 1000, the SMS telemetry gateway uses the originating address field to determine the routing to the service provider 935 and to check for any delivery preferences stored in database 933. The converted message is ready for delivery to the service provider 935 in step 1065. Upon delivery, the service provider 935 typically transmits a delivery confirmation response to the SMS telemetry gateway. The SMS telemetry gateway 930 performs steps 1050-1065 in a matter of milliseconds, which is a significant improvement over the conventional "store and forward" techniques of the SMSC platforms used in SMS systems.

Figure 11B:
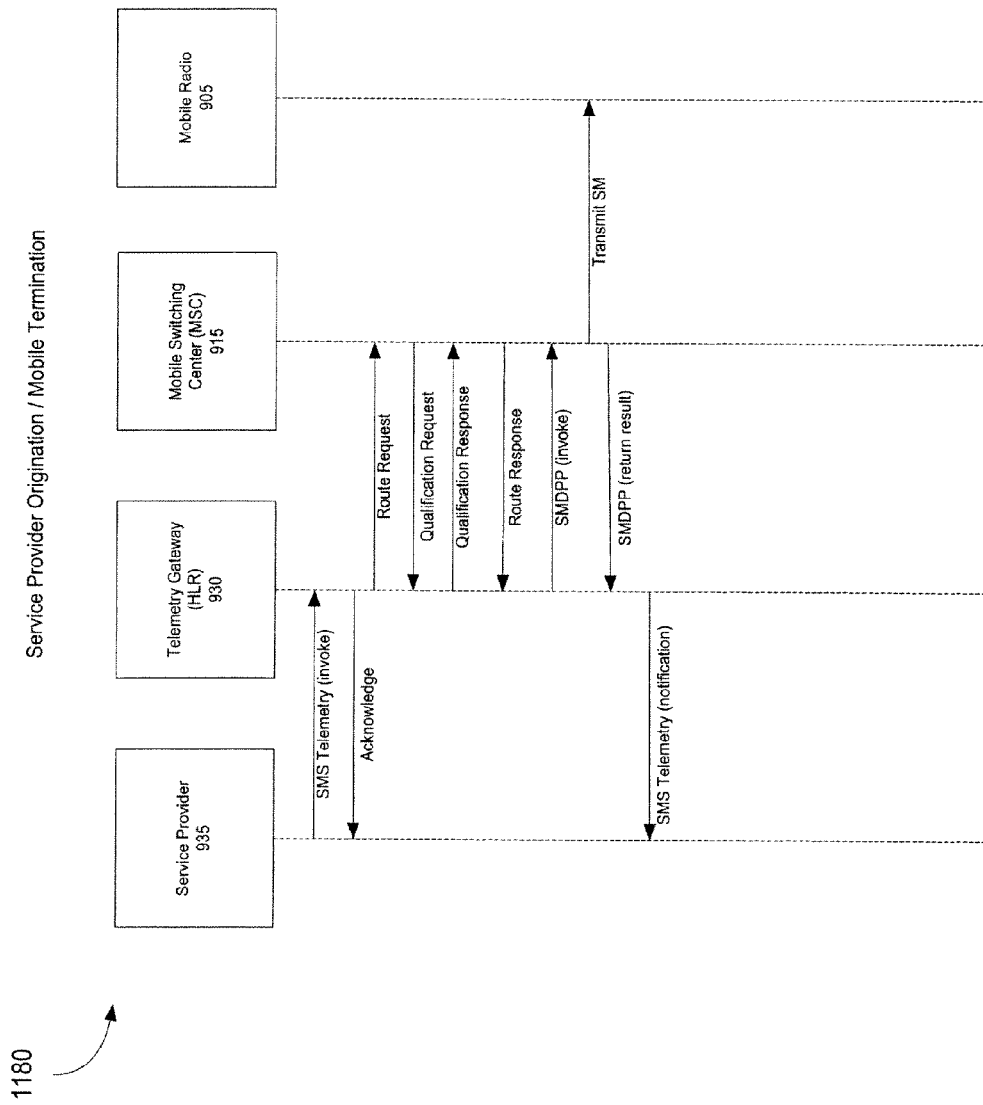
FIG. 11B is a ladder diagram illustrating the sequence of communications for a message terminating at a mobile radio as described in FIG. 11A according to an exemplary embodiment of the present invention.

Turning to FIG. 11A, an exemplary method 1100 is illustrated for transmitting a message that originates at a service provider and terminates at a mobile radio. Exemplary ladder diagram 1180 shown in FIG. 11B also illustrates the sequence of steps described in exemplary process 1100. Process 1100 begins with the service provider 935 transmitting a message, or SM, to the SMS telemetry gateway 930 in step 1105. The service provider 935 receives the message from a subscriber using one of the messaging systems that the service provider 935 supports such as an email or paging system. In steps 1110 and 1115, the SMS telemetry gateway 930 sends an acknowledgment to the service provider 935 and requests routing information for the message from the switch 915 in the destination network. If there is a VLR entry for the SMS telemetry gateway in step 1120, the switch will proceed with providing the routing information in step 1135.

However, if the switch 915 does not recognize the radio 905, the switch will need to create a VLR entry in its database. The switch 915 creates a VLR entry in steps 1125 and 1130 by sending a qualification request for account and service information to the SMS telemetry gateway 930. Once the switch 915 creates a VLR entry, it can provide the routing information for the SMS telemetry gateway 930 in step 1135.

The wireless access format that the destination network employs is typically stored in a database at the SMS telemetry gateway 930. The SMS telemetry gateway 930 uses the format information to convert the message, in step 1140, to the format expected at the destination network. In steps 1145 and 1150, the SMS telemetry gateway 930 transmits the converted message to the switch 915 and the switch 915 forwards the message to the radio 905. Consistent with the guaranteed delivery of the SMS system, the switch 915 returns an acknowledgment of delivery in step 1155 and the SMS telemetry gateway 930 forwards an acknowledgment to the service provider 935 in step 1160.

In conclusion, the present invention, as represented in the foregoing exemplary embodiments, provides a system and method for communicating short messages that is more flexible and efficient than conventional SMS systems. The exemplary SMS telemetry gateway can convert messages to different message formats in order to support communication with a variety of wireless networks. The exemplary SMS telemetry gateway also performs the routing functions of components in conventional SMS systems, but does so more quickly and efficiently.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalents thereof. For instance, the present invention could be implemented in data networks other than the SS7 network illustrated in exemplary architecture 900. The invention can also be adapted to support communication with messaging protocols other than the wireless access formats described herein.

What is claimed is:

1. A method for communicating messages between a first device having a home network and a second device, comprising the steps of:
    receiving an SMS message that originated at the first device while the first device was in the home network, the SMS message comprising an identifier and having a first data format;
    considering the SMS message as roaming;
    responsive to determining the identifier of the SMS message, accessing a database to retrieve a profile for the first device and the second device;
    determining, based on the retrieved profile, whether the first device and the second device communicate using incompatible data formats; and
    converting the SMS message from the first format to one of at least three different formats that is selected according to the retrieved profile; and
    transmitting the converted SMS message for receipt by the second device.

2. The method of claim 1, wherein a gateway performs the receiving, accessing, determining, converting, and transmitting steps.

3. The method of claim 1, wherein substantially less than one second lapses between the receiving step and the transmitting step.

4. The method of claim 1, wherein a gateway completes the receiving, accessing, determining, converting, and transmitting steps in a few milliseconds.

5. The method of claim 1, wherein less than ten milliseconds passes between the receiving step and the transmitting step.

6. The method of claim 1, wherein the converting step comprises processing the SMS message with a selected one of at least three translators that are coupled to the database via a controller.

7. The method of claim 1, wherein the identifier comprises a mobile identification number (MIN).

8. The method of claim 1, wherein the identifier comprises an international mobile station identifier (IMSI).

9. The method of claim 1, wherein the first device comprises a radio communication device and the second device comprises a mobile switching center.

10. The method of claim 1, wherein the step of considering the SMS message as roaming comprises querying a visitor location register for the home network regardless of whether the first device is represented in a home location register for the home network.

11. The method of claim 1, wherein the receiving, accessing, determining, converting, and transmitting steps are performed at an arbitrator, and
    wherein the method further comprises the steps of:
        at the arbitrator, converting a second SMS message from the first format to a second of the at least three different formats; and
        at the arbitrator, converting a third SMS message from the first format to a third of the at least three formats,
        wherein the one of the at least three different formats, the second of the at least three different formats, and the third format of the at least three different formats are different from one another.

12. The method of claim 1, wherein receiving the SMS message comprises intercepting the SMS message.

13. A method comprising the steps of:
    based on data contained within an SMS message that has been sent from a communication device having a home network and that has a first format, determining an identifying characteristic and a destination of the SMS message;
    retrieving a stored profile using the determined identifying characteristic;
    selecting a second format from at least three different formats based on the retrieved profile;
    converting the SMS message from the first format to the selected second format; and
    without completing a store and forward process, forwarding the converted SMS message for delivery,
    wherein the SMS message was sent while the communication device was in the home network,
    wherein the home network has a visitor location registry, and
    wherein the method comprises:
        designating the SMS message as roaming and querying the visitor location registry;
        if a reply to the query indicates that the visitor location registry has an entry for the communication device, processing the SMS message according to the entry; and
        if the reply to the query indicates that the visitor location registry does not have an entry for the communication device, creating an entry for the communication device in the visitor location registry.

14. The method of claim 13, wherein the first format comprises a wireless access format, and
    wherein the at least three different formats comprise a format for an email system, a format for a voicemail system, and a format for a web-based messaging system.

15. The method of claim 13, wherein the first format is compatible with an email system, a voicemail system, or a web-based messaging system, and
    wherein the selected format comprises a wireless access format.

16. The method of claim 13, wherein the determining step, the retrieving step, the selecting step, the converting step, and the forwarding step execute to completion within a time period of less than about ten milliseconds.

17. The method of claim 13, wherein less than about ten milliseconds passes during the determining step, the retrieving step, the selecting step, the converting step, and the forwarding step.

18. The method of claim 13, wherein designating the SMS message as roaming and querying the visitor location registry occurs without querying a home location registry of the home network, and
   wherein the visitor location registry comprises a database comprising temporary information about subscribers of one network that are roaming in another network, and
   wherein creating the entry comprises a switch creating the entry.

19. The method of claim 13, wherein the determining step comprises intercepting the SMS message and determining the identifying characteristic and the destination of the intercepted SMS message.

20. A method for routing a message using a gateway, comprising the steps of:
   at a first time at the gateway, receiving the message from a communication device;
   at the gateway, requesting routing information from a mobile switching center;
   at the gateway, receiving the requested routing information;
   at the gateway, converting the received message from a first format to a second format that is selected from at least three formats that are different from one another based on the received routing information; and
   transmitting the converted message from the gateway to the mobile switching center at a second time that is substantially less than one second after the first time,
   wherein the gateway considers the received message and all other received messages as roaming.

21. The method of claim 20, wherein the second time is milliseconds after the first time.

22. The method of claim 20, wherein the second time is less than ten milliseconds after the first time.

23. The method of claim 20, wherein the second time is within a few milliseconds of the first time.

24. The method of claim 20, wherein the communication device is in a home network of the communication device.

25. The method of claim 24, further comprising:
   determining whether a visitor location registry for the home network contains an entry for the communication device; and
   if the visitor location registry does not contain the entry, creating the entry.

26. The method of claim 20, wherein the gateway repetitively routes messages to respective mobile communication devices without querying a home location register.

27. The method of claim 20, further comprising the steps of:
   at the gateway, receiving a second message from a service provider;
   at the gateway, requesting routing information for the second message from a switch at a destination network;
   at the gateway, receiving the requested routing information;
   at the gateway, converting the second message to a wireless access format used at the destination network; and
   transmitting the converted second message according to the received routing information.

28. The method of claim 20, wherein the gateway considers the received message as roaming while the communication device is in a home network of the communication device when the receiving step occurs,
   wherein the home network has a home location registry, and
   wherein the gateway processes the message without querying the home location registry between the first time and the second time.

29. The method of claim 20, wherein the communication device has a home network, and
   wherein the step of receiving the message comprises at the first time at the gateway, receiving the message from the communication device that is in the home network.

30. A method comprising the steps of:
   based on data contained within an SMS message that has been sent and that has a first format, determining an identifying characteristic and a destination of the SMS message;
   retrieving a stored profile using the determined identifying characteristic;
   selecting a second format from at least three different formats based on the retrieved profile;
   converting the SMS message from the first format to the selected second format; and
   without completing a store and forward process, forwarding the converted SMS message for delivery,
   wherein the SMS message has been sent by a mobile communication device having a home network, and
   wherein the SMS message is treated as roaming regardless of whether the mobile communication device sent the SMS message while the mobile communication device was in the home network.

* * * * *